US010545584B2

(12) United States Patent
Tome et al.

(10) Patent No.: US 10,545,584 B2
(45) Date of Patent: Jan. 28, 2020

(54) VIRTUAL/AUGMENTED REALITY INPUT DEVICE

(71) Applicant: GOOGLE INC., Mountain View, CA (US)

(72) Inventors: Basheer Tome, San Francisco, CA (US); Hayes S. Raffle, Palo Alto, CA (US); Chun Yat Frank Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/597,776

(22) Filed: May 17, 2017

(65) Prior Publication Data

US 2017/0336882 A1    Nov. 23, 2017

Related U.S. Application Data

(60) Provisional application No. 62/337,677, filed on May 17, 2016.

(51) Int. Cl.
*G06F 3/0346*    (2013.01)
*G06F 3/038*    (2013.01)
(Continued)

(52) U.S. Cl.
CPC ............ *G06F 3/0346* (2013.01); *G06F 3/011* (2013.01); *G06F 3/038* (2013.01);
(Continued)

(58) Field of Classification Search
CPC ........ G06F 3/017; G06F 3/011; G06F 3/0346; G06F 3/04815; G06F 3/03547;
(Continued)

(56) References Cited

U.S. PATENT DOCUMENTS

| 5,884,029 A | 3/1999 | Brush et al. |
| 7,613,569 B2 | 11/2009 | Sherony et al. |

(Continued)

FOREIGN PATENT DOCUMENTS

| CN | 102254346 A | 11/2011 |
| WO | 2013181026 A1 | 12/2013 |

OTHER PUBLICATIONS

Friedman, et al., "Spatial Social Behavior in Second Life", LNCS, vol. 4722, 2007, 12 pages.
(Continued)

*Primary Examiner* — Md Saiful A Siddiqui
(74) *Attorney, Agent, or Firm* — Brake Hughes Bellermann LLP

(57) ABSTRACT

A controller configured to control a pointer in a virtual reality environment includes a multi-axis magnetic field sensor, a multi-axis accelerometer, a gyroscope, a touchpad, and a wireless communications circuit. The controller can also include a processor and a memory storing instructions that when executed by the processor, cause the processor to obtain geomagnetic field data from the multi-axis magnetic field sensor, obtain acceleration data describing a direction and a magnitude of force affecting the controller from the multi-axis accelerometer, and obtain angular velocity data describing a rotational position of the controller from the gyroscope. The processor can communicate movement data to a computing device configured to generate a rendering of the virtual reality environment, the movement data describing an orientation of the controller wherein the movement data is based on at least one of the geomagnetic field data, the acceleration data, or the angular velocity data.

29 Claims, 19 Drawing Sheets

(51) Int. Cl.
| | | |
|---|---|---|
| *G06F 3/0354* | (2013.01) | |
| *G06F 3/01* | (2006.01) | |
| *G06F 3/0482* | (2013.01) | |
| *G06F 3/0484* | (2013.01) | |
| *G06F 3/0485* | (2013.01) | |
| *G06F 3/0488* | (2013.01) | |

(52) U.S. Cl.
CPC ...... *G06F 3/03547* (2013.01); *G06F 3/04855* (2013.01); *G06F 3/0482* (2013.01); *G06F 3/04842* (2013.01); *G06F 3/04883* (2013.01)

(58) Field of Classification Search
CPC .... G06F 3/038; G06F 3/0482; G06F 3/04842; G06F 3/04855; G06F 3/04883
See application file for complete search history.

(56) References Cited

U.S. PATENT DOCUMENTS

| | | | |
|---|---|---|---|
| 8,762,043 | B2 | 6/2014 | Eidehall et al. |
| 9,152,248 | B1* | 10/2015 | Powers, III ............. A63F 13/06 |
| 9,183,676 | B2 | 11/2015 | McCulloch et al. |
| 2004/0254728 | A1 | 12/2004 | Poropat |
| 2008/0168478 | A1* | 7/2008 | Platzer ................ G06F 3/04845 |
| | | | 719/328 |
| 2010/0286942 | A1* | 11/2010 | Dohta ..................... A33F 13/02 |
| | | | 702/104 |
| 2010/0295667 | A1* | 11/2010 | Kyung .................... G06F 3/016 |
| | | | 340/407.2 |
| 2011/0163955 | A1 | 7/2011 | Nasiri et al. |
| 2012/0026408 | A1* | 2/2012 | Lee ...................... H04N 5/4403 |
| | | | 348/734 |
| 2013/0099903 | A1 | 4/2013 | Yu et al. |
| 2014/0002390 | A1* | 1/2014 | Lee .......................... G06F 3/041 |
| | | | 345/173 |
| 2014/0278183 | A1 | 9/2014 | Zheng et al. |
| 2014/0316708 | A1 | 10/2014 | Mollineaux et al. |
| 2015/0212647 | A1 | 7/2015 | Kim et al. |
| 2015/0331485 | A1* | 11/2015 | Wilairat ............. G02B 27/0172 |
| | | | 345/156 |
| 2016/0085403 | A1* | 3/2016 | Koga .................... G06F 3/0485 |
| | | | 345/684 |
| 2016/0291666 | A1* | 10/2016 | Hosoya ................. G06F 9/453 |
| 2017/0115839 | A1* | 4/2017 | Park ...................... G02B 27/017 |
| 2017/0243327 | A1* | 8/2017 | Zhang ..................... G06F 3/017 |

OTHER PUBLICATIONS

Metz, Rachel , "How to Avoid Real Objects While in a Virtual World", MIT Technology Review, Jun. 12, 2015, 8 pages.
Robertson , "The second HTC Vive development kit has a built-in camera and new controllers", retrieved on May 4, 2016 from http://www.theverge.com/2016/1/5/10714522/htcvalvevivepreev2developmentkitces2016, Jan. 5, 2016, 7 pages.
Shanklin , "HTC Vive Pre handson: Chaperone system means less chance of smacking into things", retrieved on May 4, 2016 from http://www.gizmag.com/htcviveprereviewhandson/41182/, Jan. 5, 2016, 8 pages.
Volpe , "HTC's making virtual reality safe for the home with Chaperone", retrieved on May 4, 2016 from http://www.engadget.com/2016/01/05/htcvivevirtualrealitychaperone/, Jan. 5, 2016, 15 pages.
Wilcox , et al., "Personal space in virtual reality", ACM Transactions on Applied Perception (TAP), vol. 3, Issue 4, Oct. 2006, pp. 412-428.
International Search Report and Written Opinion received for PCT Patent Application No. PCT/US2017/033102, dated Aug. 28, 2017, 20 pages.
Lozev, "Mobile VR Control Scheme with Gyro Mouse Part 1", available online at <https://www.youtube.com/watch/?v=YSWYxWPiCA8&index=1&list=PL-tPOSxi4jG-G03mFRS9ZTCBzuAMJjREC>, Sep. 20, 2015, 3 pages.
Strømberg, "Air Mouse for VR", available online at <https://www.youtube.com/watch?v=rrqGBr0N9Iw>, Aug. 26, 2014, 3 pages.
Written Opinion of the International Preliminary Examining Authority for International Application PCT/US2017/033102, dated Mar. 27, 2018, 20 pages.
Written Opinion of the International Preliminary Examining Authority for PCT Application No. PCT/US2017/033102, dated Jun. 25, 2018, 20 pages.

* cited by examiner

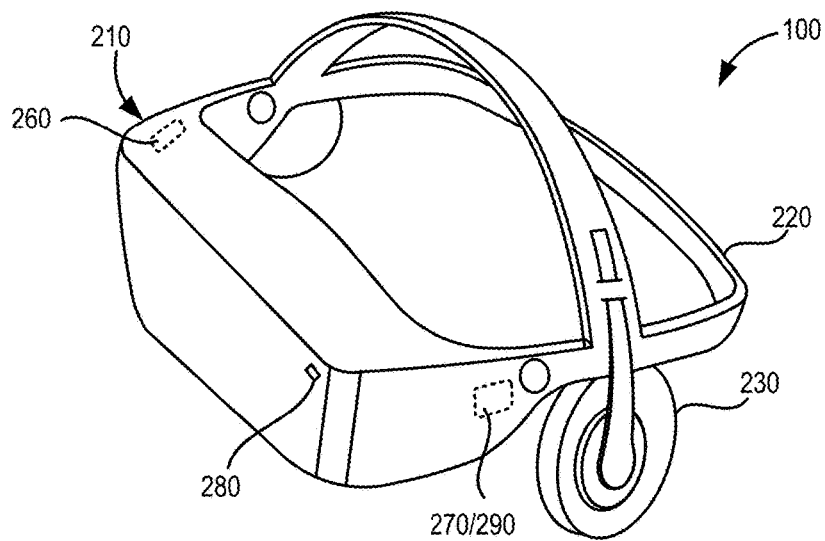
FIG. 2A
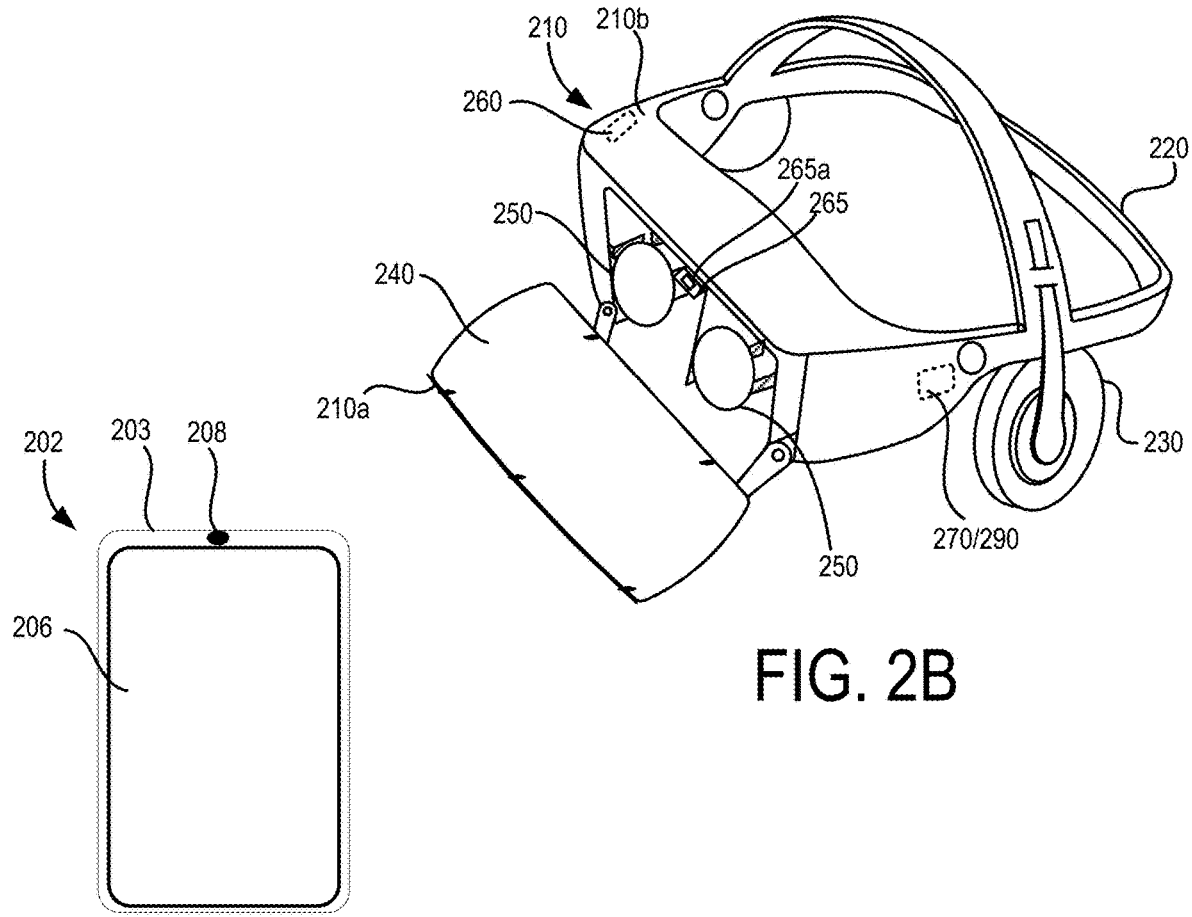
FIG. 2C
FIG. 2B

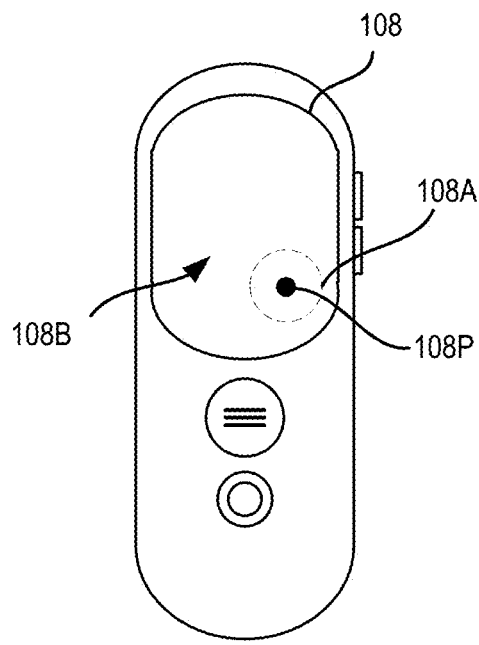 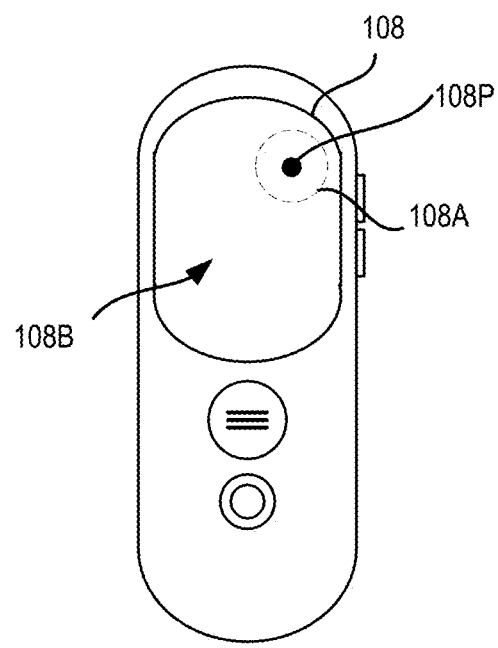
FIG. 9A  FIG. 9B
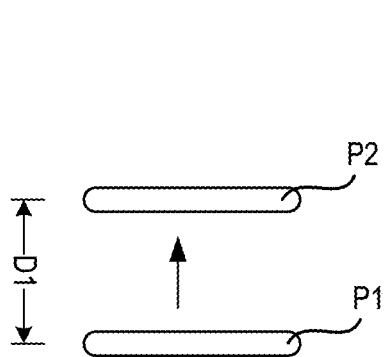 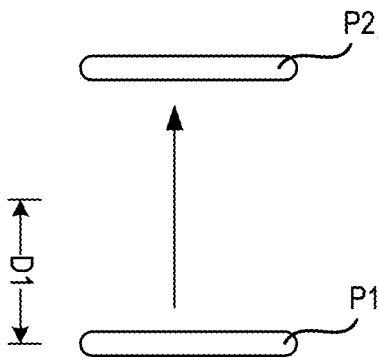
FIG. 9C  FIG. 9D

VIRTUAL/AUGMENTED REALITY INPUT DEVICE

CROSS-REFERENCE TO RELATED APPLICATION

This application claims priority to U.S. Provisional Application No. 62/337,677, filed May. 17, 2016, the contents of which are hereby incorporated herein by reference in its entirety.

TECHNICAL FIELD

This document relates, generally, to the processing of inputs in an augmented reality environment and/or a virtual reality environment.

BACKGROUND

An augmented reality (AR) system and/or a virtual reality (VR) system may generate a three-dimensional (3D) immersive environment. A user may experience the augmented and/or virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the augmented and/or virtual environment, the user may interact in the virtual environment in different ways for selection and/or manipulation of virtual objects and other such interactions in the virtual environment. For example, the user may provide input through manipulation of an external electronic device, eye gaze, physical movement and/or gestures, and the like to interact with, personalize and control the virtual environment.

SUMMARY

In one aspect, a controller configured to control a pointer in a virtual reality environment includes a multi-axis magnetic field sensor, a multi-axis accelerometer, a gyroscope, a touchpad, and a wireless communications circuit. The controller can also include a processor and a memory storing instructions that when executed by the processor, cause the processor to obtain geomagnetic field data from the multi-axis magnetic field sensor, obtain acceleration data describing a direction and a magnitude of force affecting the controller from the multi-axis accelerometer, and obtain angular velocity data describing a rotational position of the controller from the gyroscope. The stored instructions can also cause the processor to communicate, via the wireless communications circuit, movement data to a computing device configured to generate a rendering of the virtual reality environment, the movement data describing an orientation of the controller wherein the movement data is based on at least one of the geomagnetic field data, the acceleration data, or the angular velocity data.

In some implementations, the stored instructions can also cause the processor to detect touch events on the touchpad and generate touchpad input data responsive to the detected touch events and communicate, via the wireless communications circuit, the touchpad input data to the computing device. In some implementations, the stored instructions can cause the processor to initiate communication of the touchpad input data when the touchpad input data reflects a change in position of the detected touch events satisfies a touchpad threshold position value. In some implementations, the controller can further include a first input button disposed at a position below the touchpad, and/or a second input button, and/or a pair of buttons corresponding to adjusting a range value in the virtual reality environment.

In some further implementations, the stored instructions can cause the processor to initiate communication of the movement data when the geomagnetic field data, the acceleration data, or the angular velocity data satisfy a threshold value. The stored instructions can cause the processor to adjust the threshold value based on the rate of change of the geomagnetic field data, the acceleration data, and/or the angular velocity data.

In some implementations, the stored instructions can further cause the processor to obtain the geomagnetic field data, the acceleration data, and the angular velocity data responsive to detecting that input button has been pressed. The stored instructions can further cause the processor to generate updated movement data based on the obtained geomagnetic field data, acceleration data, and angular velocity data, and communicate the updated movement data to the computing device configured to generate a rendering of the virtual reality environment. In some implementations, the movement data includes the geomagnetic field data, the acceleration data, and the angular velocity data, and the updated movement data includes the obtained geomagnetic field data, acceleration data, and angular velocity data that has been obtained based responsive to detecting that input button has been pressed.

In some implementations, the computing device configured to generate the rendering of the virtual reality environment is disposed within an HMD housing, and the wireless communications circuit complies with the Bluetooth® specification. In some implementations, the wireless communications circuit complies with the Bluetooth® low energy specification. In some implementations, the instructions further cause the processor to use a swipe boundary line to recognize gestures performed on the touchpad, the swipe boundary line being based on testing. In some implementations, the instructions further cause the processor to define a virtual beam in the virtual reality environment using the movement data, the virtual beam angled relative to a zero line of the controller.

Other embodiments of this aspect include corresponding methods configured to perform the operations of the processor of the controller according to the instructions stored in the controller's memory.

In another aspect, a virtual reality computer system includes a display screen capable of rendering a virtual environment disposed within a heads-mounted display (HMD), a multi-axis accelerometer, a gyroscope, and a wireless communications circuit. The virtual reality computer system can also include a processor and memory storing instructions that when executed by the processor cause the processor to obtain acceleration data describing a direction and a magnitude of force affecting the controller from the multi-axis accelerometer, and obtain angular velocity data describing a rotational position of the controller from the gyroscope. The instructions can further cause the processor to determine first movement data describing an orientation of the HMD relative to a controller in wireless communication with the virtual reality computer system, the first movement data being based on the acceleration data and the angular velocity data. The instructions can further cause the processor to obtain, via the wireless communications circuit, second movement data from the controller, the second movement data describing an orientation of the controller. The instructions can further cause the processor to render on the display screen a pointer based on the first movement data and the second movement data.

In some implementations, the instructions can further cause the processor to render a calibration user interface element on the display screen at a calibration location and detect an input event triggered by the controller. The input event can represent a selection event performed by the controller at the calibration location. The instructions can further cause the processor to determine a calibration value based on the first movement data, the second movement data, and the calibration location. The instructions can further cause the processor to render the pointer on the display screen based on the first movement data, the second movement data, and the calibration value.

In some implementations, the instructions can further cause the processor to receive, via the wireless communication circuit, touchpad input data describing one or more touch events detected by the controller on a touchpad of the controller and modifying a virtual object at a position of the pointer based on the received touchpad data.

In some implementations, the virtual reality computing device is a mobile computing device, and the mobile computing device may be disposed within an HMD housing in some implementations. In some implementations, the wireless communications circuit complies with the Bluetooth® specification or the Bluetooth® low energy specification.

Other embodiments of this aspect include corresponding methods configured to perform the operations of the processor of the virtual reality computer system according to the instructions stored in the virtual reality computer system's memory.

In another aspect, a method for manipulating a virtual object in a virtual environment receives, by a computer system, first movement data from a controller describing a first orientation of the controller. The method also renders on a display screen of the computer system, a pointer at a pointer position within a virtual environment based on the received first movement data. The method also sets an anchor point on a virtual object rendered at the pointer position based on the pointer position. The method can also receive first input event data from the controller and modify the virtual object based on the received first input event data.

In some implementations, the method further includes receiving second input event data from the controller and the setting of the anchor point can be done responsive to receiving the second input event. In some implementations, the second input event data can describe depression of an input button of the controller, and the input button of the controller can be disposed under the touchpad of the controller in some embodiments. In some implementations, the method further includes receiving third input event data from the controller describing a second orientation of the controller. The first input event data can also include, in some implementations, touch input event data corresponding to a touch event captured by a touchpad of the controller. The touch input event data can describe, for example, a swipe event, and/or a touch-and-drag event, and/or a zoom event. In some implementations, the first movement data describes an orientation of the controller relative to a magnetic field affecting the controller and the computer system.

Other embodiments of this aspect include corresponding computer systems, apparatus, and computer programs recorded on one or more computer storage devices, each configured to perform the operations of the method summarized above.

The details of one or more implementations are set forth in the accompa-nying drawings and the description below. Other features will be apparent from the description and drawings, and from the claims.

BRIEF DESCRIPTION OF DRAWINGS

FIGS. 2A and 2B shows a perspective view of an example head mounted display, and FIG. 2C shows a perspective view of a handheld electronic device, consistent with disclosed embodiments.

FIGS. 5A-5C, 6A-6C, 7A-7C, 8A-8F and 9A-9D illustrate example implementations of use of a controller combined with a touchpad input in a virtual reality environment, consistent with disclosed embodiments.

DETAILED DESCRIPTION

A user immersed in a virtual environment wearing, for example, a head mounted display (HMD) device may explore the virtual environment and interact with the virtual environment through various different types of inputs including, for example, manipulation of an electronic device separate from the HMD, and/or manipulation of the HMD itself, and/or eye directional gaze, and/or head movement and/or hand/arm gestures, and the like. The user may manipulate a handheld electronic device, or controller, together with the HMD, to control the virtual environment or cause a desired action in the virtual environment. In particular, in some situations, a user may manipulate a controller in a variety of different ways to provide input to the virtual environment, such as for example, manipulating a graphic element—such as a pointer—that can be used to select objects or user interface elements in the virtual environment. This capability may provide flexibility and convenience in providing user input, and may enhance the user's virtual experience.

In some instances, since both the controller and the HMD affect the virtual environment using movements from their respective reference points, the orientation of the controller relative to the HMD in the real world is not synchronized with the position of the pointer and the user's perspective of the virtual environment.

In a system and method, in accordance with disclosed embodiments, the HMD worn by a user experiencing the virtual environment and the controller operated by the user are synchronized by using movement data relative to a same point of reference. In one embodiment, the point of reference is the Earth, and the system uses the magnetic and gravitational fields of the Earth to synchronize the positions of the HMD and the controller so that the user's physical movements in the real world are synchronized with the virtual world.

A system and method, in accordance with implementations described herein, may also allow for user manipulation of a virtual display of virtual objects, features, or options when they exceed or fall outside of the available virtual display area. The user may, using the disclosed embodiments, scroll, zoom in and/or out, rotate, or otherwise manipulate the virtual objects, using, for example a controller having a touch input surface, and also having the capability to provide movement information, such as rotation, of the controller.

While the present disclosure may refer to virtual reality, virtual environments, VR, and computer systems related to VR/virtual reality, the disclosed embodiments could also be used to generate augmented reality environments. Therefore, the use of the terms virtual reality, virtual reality environments, VR, and the like are for ease of discussion. The disclosed embodiments can, and are intended to, additionally apply to augmented reality and augmented reality environments.

Figure 1:
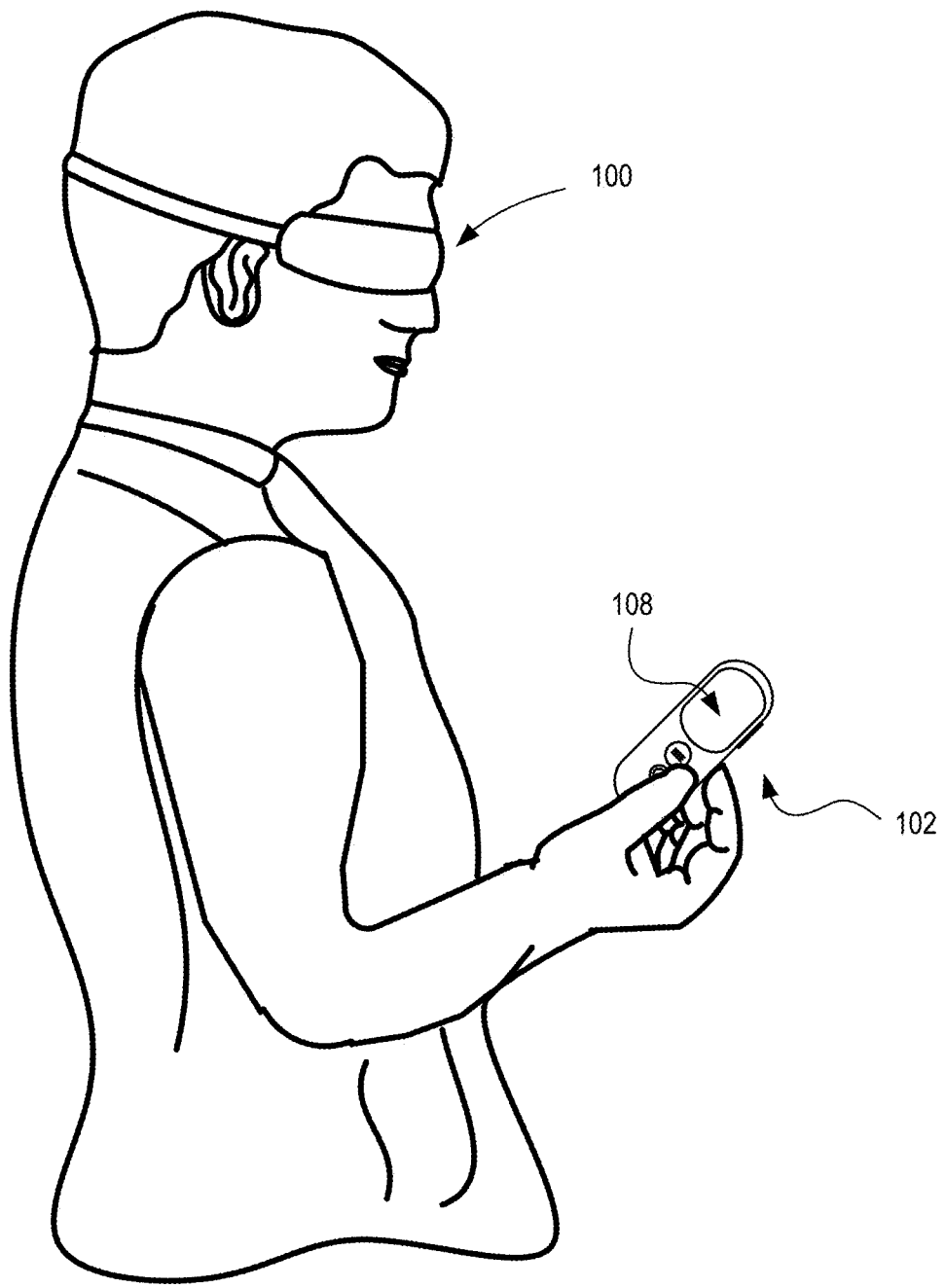
FIG. 1 is an example implementation of a virtual reality system including a head mounted display and a handheld electronic device consistent with disclosed embodiments.

In the example implementation shown in FIG. 1, a user wearing an HMD 100 is holding a portable handheld electronic device 102. The portable handheld electronic device 102 may be, for example, a gyromouse, a smartphone, or other type of controller that may be paired with, and communicate with, the HMD 100 for interaction in the immersive virtual experience generated by the HMD 100. In some implementations, a six degree of freedom (6 DOF) position and/or orientation of the handheld electronic device 102 may be tracked based on various sensors included in the device 102, such as, for example, an inertial measurement unit including, for example, an accelerometer, a gyroscope, a magnetometer, and the like as in a gyromouse, or a smartphone adapted in this manner. In some implementations, a 6 DOF position and/or orientation of the handheld electronic device 102 may be tracked based on a position of the device 102 detected by other sensors in the system, such as, for example image sensors included on the HMD 100, together with orientation sensors included in the device 102. The handheld electronic device 102 may be operably coupled with, or paired with the HMD 100 via, for example, a wired connection, or a wireless connection such as, for example, a WiFi, Bluetooth®, Bluetooth® low-energy (also known as Bluetooth Smart®) connection, to provide for the exchange of data and communication between the device 102 and the HMD 100, allowing the handheld electronic device 102 to function as a controller. That is, a manipulation of the handheld electronic device 102, such as for example an input received on a touch surface of the handheld electronic device 102, or a physical movement of the handheld electronic device 102, or a virtual ray or beam emitted by the handheld electronic device 102 directed by the user, may be translated into a corresponding interaction, or movement, in the virtual environment. For ease of discussion, the handheld electronic device will be referred to as a controller 102, simply for ease of discussion.

In some embodiments, the controller 102 may be operable in free space to, for example, select, manipulate and in other manners interact with objects in the virtual environment. The controller 102 may include, for example, a gyroscope that generates a signal indicating angular velocity of the controller 102 that can be translated into directional movement in the virtual environment. In some implementations, the controller 102 may also include an accelerometer that generates a signal indicating the direction and magnitude of the force experienced of the controller 102, for example, acceleration in a direction corresponding to the movement of the controller 102 and/or the gravitational field of Earth acting on the controller 102. In some implementations, the controller 102 can also include a magnetometer that generates a signal indicating relative position of the controller 102 in real world space based on the strength and/or direction of a detected magnetic field. In some embodiments, the detected magnetic field is the magnetic field of Earth. The detected three dimensional position of the controller 102 in the real world space, together with orientation information related to the controller 102 provided by the gyroscope and/or accelerometer and/or magnetometer, may provide for 6 DOF tracking of the controller 102, so that user manipulation of the controller 102 may be translated into an intended interaction in the virtual environment and/or directed to an intended target in the virtual environment. In some implementations, the controller 102 may be a portable electronic device such as, for example, a smartphone or other portable handheld device equipped with these types of sensors, so that a position and an orientation of the controller 102 may be tracked, and user manipulation of the controller 102 may be translated into an intended interaction in the virtual environment and/or directed to an intended target in the virtual environment. In some implementations, the controller 102 can be a dedicated handheld electronic device designed for controlling virtual environments. One perspective view of an example of controller 102 designed for controlling virtual environments consistent with disclosed embodiments and implementations is shown and described below with respect to FIG. 3.

In some implementations, the controller 102 may include manipulation devices configured to receive various different types of user inputs. For example, the controller 102 may include a touch surface 108 configured to receive, for example, a touch input, a touch and drag input, a pinch and zoom input and the like. The controller 102 may also include other manipulation devices, such as, for example, one or more buttons, one or more toggle switches and the like, configured to receive user inputs.

In some implementations, controller 102 may receive user inputs in a variety of different input modes to be translated into corresponding interactions in the virtual environment. These user input modes may include, for example, a physical movement or gesture of the controller 102 detected by the sensors included in the controller 102, a touch input (including a tap, swipe, tap and hold, touch and drag, pinch and zoom, etc.) detected by the touch surface 108 of the controller 102, selection received at one of the manipulation devices 106 of the controller 102, and other such inputs. In some implementations, the controller 102 may receive a user command including a combination of these modes, or a sequential application of these modes.

In some embodiments, the HMD 100 can include an HMD housing and a handheld electronic device, such as a mobile device, smartphone, personal digital assistant, tablet computing device, or any other portable electronic computing device of appropriate size so that it can be placed within the HMD housing to provide a virtual reality experience for the user. In such embodiments, the handheld electronic device can provide the display and processing required to render a virtual environment for the user, and the mobile device can also provide the multi-axis magnetic field sensor (such as, a magnetometer), accelerometer, gyroscope that can be used by the processor of the handheld electronic device to determine the position and/or orientation of the HMD 100. FIGS. 2A and 2B are perspective views of an example HMD, such as, for example, the HMD 100 worn by the user in FIG. 1, and FIG. 2C illustrates an example mobile device handheld electronic device 202 that can be disposed within an HMD housing 210 to create an HMD 100.

The handheld electronic device 202 may include a housing 203 in which internal components of the handheld electronic device 202 are received, and the touchscreen 206 on an outside of the housing 203, accessible to the user. The touchscreen 206 can include a touch sensitive surface configured to receive user touch inputs. The handheld electronic device 202 can also include other components for manipulation by the user such as, for example, actuation buttons, knobs, joysticks and the like. In some embodiments, at least a portion of the touchscreen 206 can be configured to display user interface items to the user, and also to receive touch inputs from the user. According to some embodiments, the touchscreen 206 can be configured to render a virtual environment.

The HMD 100 can include a housing 210 coupled to a frame 220, with an audio output device 230 including, for example, speakers mounted in headphones, coupled to the frame 220. In FIG. 2B, the front portion 210a of the housing 210 is rotated away from the base portion 210b of the housing 210 so that the handheld electronic device 202 can be disposed within the HMD 100. In some embodiments, the handheld electronic device 202 can be mounted on an interior facing side of the front portion 210a of the housing 210 so that the touchscreen 206 can be viewed using the lenses 250. The lenses 250 can be mounted in the housing 210, between the user's eyes and the touchscreen 206 when the front portion 210a is in the closed position against the base portion 210b of the housing 210. In some embodiments, the HMD 100 can include a dedicated display disposed on front portion 210a. In such embodiments, the dedicated display can be controlled by a computer system configured to render virtual environments for the user. In such embodiments, the handheld electronic device 202 may not be disposed within the housing 210, and instead, the HMD 100 may be a peripheral I/O device in communication with the computer system rendering the virtual environment In some embodiments, the HMD 100 can include sensing system 260 including various sensors and a control system 270 including a processor 290 and various control system devices to facilitate operation of the HMD 100. In such embodiments, sensing system 260, control system 270, and processor 290 can operate to provide movement data to an external computing system capable of rendering a virtual environment. In some embodiments, HMD 100 does not include the sensing system 260, and instead, in such embodiments, the functionality of the sensing system 260 may be provided by the handheld electronic device 202. For example, the sensors, such as the multi-axis magnetic field sensor (such as, a magnetometer), accelerometer, gyroscope and the processor of sensing system 260 may be the sensors and processor of the handheld electronic device 202. In some embodiments, the sensing system 260 can operate in conjunction with the sensing system of handheld electronic device 202 (e.g., the sensors, such as the multi-axis magnetic field sensor (such as, a magnetometer), accelerometer, gyroscope and the processor of the handheld electronic device 202) to provide movement data to a co-presence client application and/or co-presence manager.

In some embodiments, the HMD 100 can include a camera 280 to capture still and moving images. The images captured by camera 280 may be used to help track a physical position of the user and/or the handheld electronic device 202 in the real world, or physical environment relative to the virtual environment and/or can be displayed to the user in a pass through mode, allowing the user to temporarily leave the virtual environment and return to the physical environment without removing the HMD 100 or otherwise changing the configuration of the HMD 100.

Figure 3:
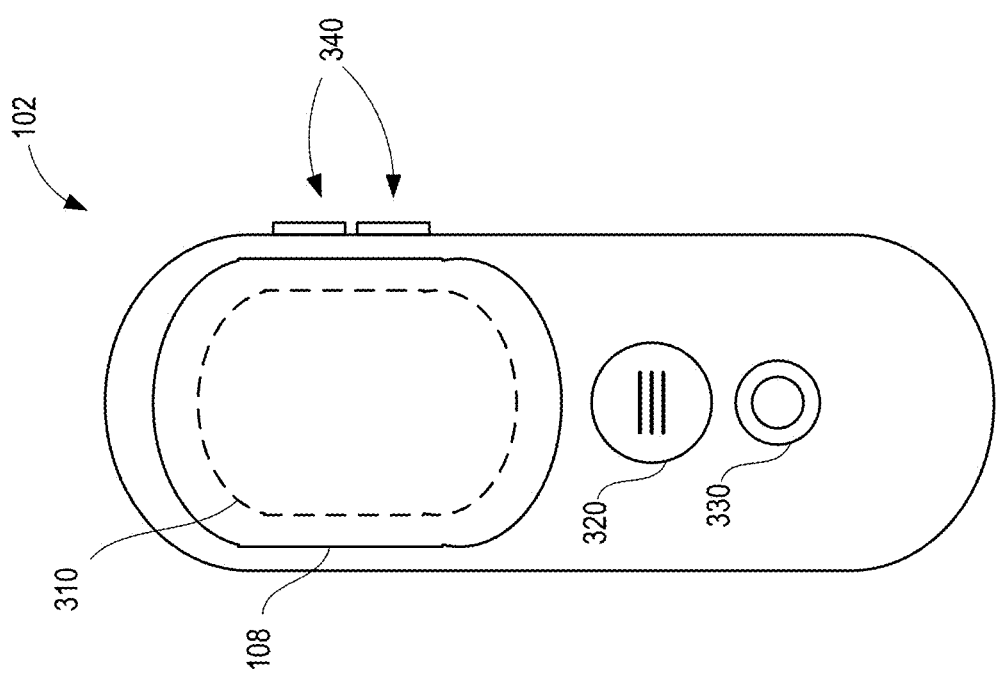
FIG. 3 shows a perspective view of a controller for a virtual environment consistent with disclosed embodiments.

In some embodiments, the HMD 100 can include gaze tracking device 265 to detect and track an eye gaze of the user. Gaze tracking device 265 can include, for example, image sensor 265A, or multiple image sensors 265A, to capture images of the user's eyes, for example, a particular portion of the user's eyes, such as, for example, the pupil, to detect, and track direction and movement of, the user's gaze. In some implementations, HMD 100 may be configured so that the detected gaze is processed as a user input to be translated into a corresponding interaction in the co-presence virtual environment FIG. 3 shows one example of a controller, such as a controller 102, consistent with disclosed embodiments. As described above, the controller 102 can include touch surface 108. The touch surface 108 can include a touch sensitive surface configured to detect touch input events of a user. For example, the touch surface 108 can be configured to detect a tap event, a tap and hold event, a swipe event, pinch and zoom style events, touch-down (or click, mouse-down) and touch-up (or release, mouse-down) events, as just a few examples. In some embodiments, responsive to detecting touch events on the touch surface 108, the controller 102 can communicate touchpad movement data to a computer system rendering the virtual environment (such as, the handheld electronic device 202). The touchpad movement data can include, for example, the position of the user's touch on the touch surface 108 and the nature of the touch (such as a tap, swipe, or pinch, for example). Consistent with disclosed embodiments, the touchpad movement data can be used by the computer system rendering the virtual environment to change a user interface at the location of the pointer controlled by controller 102, as discussed in more detail below.

According to some embodiments, the controller 102 can include an input button 310 that is disposed in the controller 102 underneath the touch surface 108. The input button 310 can be used to provide further use control of a virtual environment. For example, the user experiencing the virtual environment may move the controller 102 in space to direct a pointer in the virtual environment to a position over a virtual object. To select the object and pick it up, the user may press the top of touch surface 108 with force engaging the input button 310. The controller 102, detecting the engagement of the input button 310, may send a communication to a computer system rendering the virtual environment indicating that the user has made a selection event at the current position of the pointer. The computer system rendering the virtual environment may respond by changing the appearance of the object to indicate that the user has picked it up. The user may also, for example, swipe up on the touch surface 108. The controller 102, detecting the swipe event, may communicate touchpad movement data describing the nature of the user's swipes to the computer system rendering the virtual environment, which may respond by rotating the object in space as if the user were rotating the object with the user's hands.

The controller 103 can also include additional buttons that a user may operate to affect the virtual environment. For example, the controller 103 can include an input button 320. In some embodiments, when the input button 320 is depressed by the user, the controller 102 may send a command to the computer system generating the virtual environment indicating that the user would like to display a menu relevant to the virtual environment.

The controller 102 may also include an input button 330 in addition to the input button 310. The input button 330 may enable the user to perform a second action on an object within the virtual environment that is different from a first action available to the user via input button 310. For example, the input button 330 may allow the user to throw or kick an object at the position of the pointer in the virtual environment, while input button 310 may allow the user to pick up the object.

In some embodiments the controller 103 can also include up-down buttons 340. The up-down buttons 340 can be used, in some embodiments, to increase or decrease a value within a range. For example, the up-down buttons 340 can be used to increase or decrease the volume of the audio output device 230 of the HMD 100. As another example, the up-down buttons can be used to increase or decrease the brightness of the display of the virtual environment.

Figure 4:
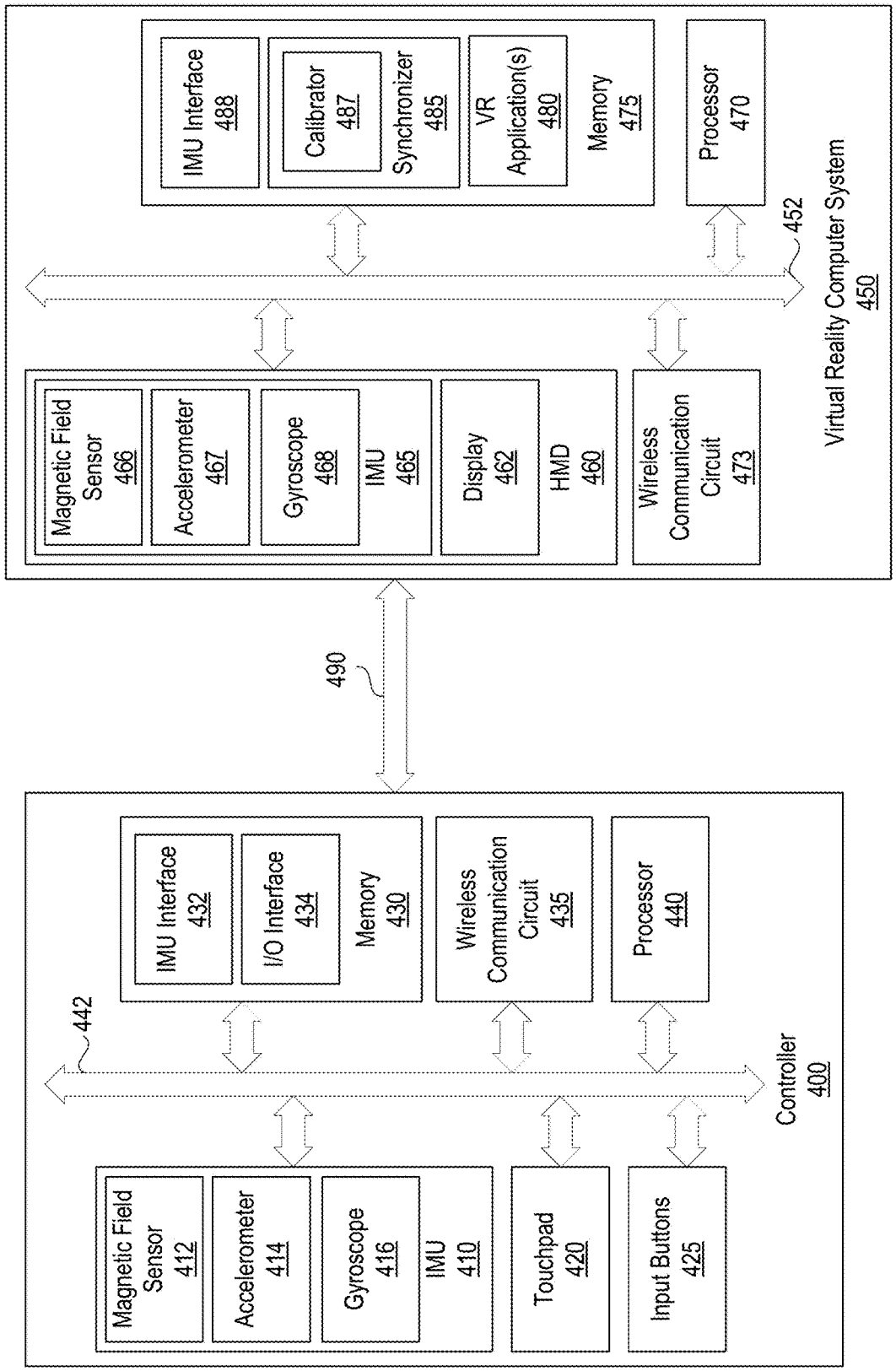
FIG. 4 shows an example block diagram for a controller and a virtual reality computer system consistent with disclosed embodiments.

FIG. 4 shows example block diagrams for embodiments of a controller 400 and a virtual reality computer system 450. The controller 400 can be, for example, the controller 102 described above. The virtual reality computer system 450 can be, for example, a computer system configured to render a virtual environment such as the handheld electronic device 202 of FIG. 2C (while disposed within HMD 100). The block diagrams of FIG. 4 show some of the components, in logical form, relevant to processes for providing a pointer in a virtual reality environment and manipulating objects within a virtual reality environment. While the block diagrams of FIG. 4 show some components, in logical form, of the controller 400 and the virtual reality computer system 450, the controller 400 and the virtual reality computer system 450 can include other components in some embodiments, including components that may perform one or more functions related to a processes for providing a pointer in a virtual reality environment and manipulating objects within a virtual reality environment.

As shown in FIG. 4, the controller 400 can include an inertial measurement unit (IMU) 410, a touchpad 420, input buttons 425, a memory 430, a wireless communications circuit 435, and a processor 440 which can communicate over a bus 442. In some embodiments, the processor 440 can access the memory 430 to obtain instructions for executing the functionality of the IMU interface 432 and the I/O interface 434.

According to some embodiments, the IMU 410 includes sensors that can be used by the IMU interface 432 to determine the position and/or orientation of the controller 400. As shown in FIG. 4, the IMU 410 can include a magnetic field sensor 412, an accelerometer 414, and a gyroscope 416. In some embodiments, the magnetic field sensor 412 can be a multi-axis magnetic field sensor, such as magnetometer, capable of detecting a magnetic field in three dimensions, such as the x, y, and z directions. The magnetic field sensor 412 can measure magnetic fields affecting the controller 400 in three-dimensional space. For example, the magnetic field sensor 412 can detect the geomagnetic field of Earth. In some embodiments, the accelerometer 414 can be a multi-axis accelerometer capable of measuring the direction and magnitude of forces affecting the controller 400 in three dimensions, such as the x, y, and z directions. In some embodiments, the gyroscope 416 can measure the angular velocity describing the rotational position of the controller 400.

According to some embodiments, the IMU 410 provides measurement data for the magnetic field sensor 412, the accelerometer 414, and the gyroscope 416 to the IMU interface 432. The IMU interface 432 can process the measurement data obtained from the IMU 410 to generate movement data reflecting the position and/or orientation of the controller 400. In some embodiments, the movement data can reflect the he position and/or orientation of the controller 400 in space, with 6 DOF, relative to the magnetic field and the gravitational field of Earth. In some embodiments, the movement data reflects processed data based on the raw data obtained from the magnetic field sensor 412, the accelerometer 414, and the gyroscope 416. Because the raw data obtained from any one of the magnetic field sensor 412, the accelerometer 414, and the gyroscope 416 can be noisy, the IMU interface 432 can combine and process the raw data to smooth it. For example, the IMU interface 432 can combine and process the raw data from the gyroscope 416 and the accelerometer 414 to generate data reflecting the gravitational field of Earth acting on the controller 400 or the linear acceleration of the controller 400 that is less noisy than if that data were provided by the accelerometer 414 alone. As another example, the IMU interface 432 can combine and process the raw data from the gyroscope 416 and the magnetic field sensor 412 to generate data reflecting the effect of the magnetic field of Earth acting on the controller 400 that is less noisy than if that data were provided by the magnetic field sensor 412 alone. In some embodiments, the IMU interface 432 can also use the raw data from the magnetic field sensor 412 and/or the accelerometer 414, and the gyroscope 416 to provide rotation data, such as the yaw, pitch, and roll of the controller 400, a rotation matrix representing the rotation of the controller 400, or a quaternion representing the rotation of the controller 400. In such embodiments, the use of the raw data from the magnetic field sensor 412 and/or the accelerometer 414 may be used to correct the bias of gyroscope 416, for example. In some embodiments, the IMU interface 432 can provide the movement data in the world coordinate system (e.g., with respect to the Earth), and/or in the body coordinate system (e.g., with respect to the controller 400).

In some embodiments, the IMU interface 432 interfaces with the wireless communication circuit 435 to communicate the movement data wirelessly via the wireless connection 490 to external computer systems such as, for example, virtual reality computer system 450. According to some embodiments, the IMU interface 432 communicates movement data when the movement data satisfy a threshold value. The threshold value can represent a change in pose significant enough to communicate the movement data to affect a change the position of the pointer controlled by controller 400 in the virtual environment. The IMU interface 432 may employ the threshold value to provide additional smoothing and to prevent noise in the movement data it communicates to the virtual reality computer system 450.

In some embodiments, the IMU interface 432 adjusts the threshold value depending on the linear acceleration or rotational acceleration of the controller 400. For example, the IMU interface 432 may adjust the threshold value up when it detects the linear acceleration of the controller 400 as high, or it may adjust the threshold value down when it detects the linear acceleration of the controller 400 as low or near zero. As an operational example, the user may be participating in a virtual environment where the user is virtually shooting at moving targets within the virtual environment. In this operational example, the IMU interface 432 may increase the threshold value because the user may be moving the controller 400 rapidly to point at, and shoot, the moving targets. Conversely, in another operational example where the user is participating in a virtual environment where the user is virtually playing a card game requiring little movement, the IMU interface 432 may decrease the threshold value because the user may be moving the controller 400 very little or not at all.

While the discussion above describes movement data as data that has been processed by the IMU interface 432, in some embodiments, the movement data can include the raw data obtained from the magnetic field sensor 412, the accelerometer 414, and the gyroscope 416. In such embodiments, the IMU interface 432 may perform operations to communicate the raw data (as movement data) to the virtual reality computer system, and in such embodiments, the IMU interface 488 may perform any smoothing or processing.

According to some embodiments, the I/O interface 434 interfaces with the touchpad 420 and the input buttons 425 to communicate touchpad input data responsive to detecting touch events on the touchpad 420 and communicate input events corresponding to the input buttons 425. For example, when a user performs a touch motion on the touchpad 420, the I/O interface 434 may forward event data corresponding to a touch motion to wireless communication circuit 435 in the form of touchpad input data, and the wireless communication circuit 435 may communicate the touchpad input data via the wireless connection 490 to the virtual reality computer system 450.

In some embodiments, the I/O interface 434 communicates the touchpad input data when the touchpad input data satisfies a threshold value. The threshold value can represent a change in the position of the detected touch event significant enough for the virtual reality computer system 450 to apply the touchpad input data to the virtual environment. The I/O interface 434 may employ the threshold value to provide smoothing and prevent noise in the touchpad input data so that the virtual reality computer system 450 receives touchpad input data reflecting a user's intentional touch events.

According to some embodiments, wireless communication circuit 435 can perform functions and operations to communicate data wirelessly via wireless connection 490 to other computer systems such as, for example, virtual reality computer system 450. In some embodiments, wireless communication circuit 435 can be an integrated circuit configured to communicate via one or more wireless communication standards or protocols such as, for example, RF, Wi-Fi, Bluetooth®, Bluetooth low energy (also known as Bluetooth smart), GSM, CDMA, LTE, or any other wireless communications protocol or standard known in the art.

As shown in FIG. 4, the virtual reality computer system 450 can include a head-mounted display (HMD) 460, a processor 470, a wireless communication circuit 473, and a memory 475 that communicate via a bus 452. As shown in FIG. 4 the HMD 460 can include a display 462 and an IMU 465. According to some embodiments, the touchscreen, IMU, processor, wireless communication circuit, and memory of a mobile device, such as handheld electronic device 202 of FIG. 2C can provide the display 462, the IMU 465, the processor 470, the wireless communication circuit 473, and the memory 475 of the virtual reality computer system 450. In such embodiments, the mobile device may be disposed within an HMD housing such as the HMD housing described with respect to FIGS. 2A and 2B described above.

In some embodiments, the IMU 465 of the virtual reality computer system 450, which can include the magnetic field sensor 466, the accelerometer 467, and the gyroscope 468, performs the same or similar functions and operations as the IMU 410 of the controller 400, which can include the magnetic field sensor 412, the accelerometer 414, and the gyroscope 416. For example, the IMU 465 of the virtual reality computer system 450 can provide raw data corresponding to the magnetic field affecting the HMD 460, the direction and magnitude of force affecting the HMD 460, and the rotational position of the HMD 460. In embodiments in which the processor 470, the wireless communication circuit 473, and the memory 475 are deployed within the HMD 460 (such as, when a mobile computing device is deployed within an HMD housing), the data provided by the IMU 465 can describe the position and/or orientation of the virtual reality computer system 450. As mentioned above, in some embodiments, the IMU 465 may perform operations to process the movement data received from the controller 400, for example, when the movement data is raw data. Furthermore, in some embodiments the movement data for the HMD may also be raw data, and in such embodiments, synchronizer 485 may be configured to perform its operations on raw data.

In some embodiments, the processor 470 can access memory 475 to obtain instructions for executing the VR applications 480, the synchronizer 485, and the IMU interface 488. According to some embodiments, the VR applications 480 can include instructions that when executed by the processor 470 render images of virtual reality environments on display 462. The VR applications 480 can include virtual reality games, applications corresponding to virtual meetings, or applications corresponding to virtual shopping experiences, as just some examples. In some embodiments, the IMU interface 488 provides similar functionality to that of the IMU interface 432 of the controller 400 described above. For example, the IMU interface 488 can process the measurement data obtained from the IMU 488 to generate movement data reflecting the position and/or orientation of the HMD 460 in space, with six degrees of freedom, relative to the magnetic field and the gravitational field of Earth.

According to some embodiments, the synchronizer 485 can include instructions that when executed by the processor 470 synchronize the position of the controller 400 with the HMD 460 of the virtual reality computer system 450. For example, the synchronizer 485 can provide instructions of where on the display 462 to render a pointer controlled by the controller 400 to the VR applications 480. The synchronizer 485 can also provide movement data obtained by the IMU interface 488 to the VR applications 480 so that the VR applications 480 can provide instructions to the processor 470 for rendering a virtual environment on the display 462 consistent with the position and/or orientation of the HMD 460.

In some embodiments, the synchronizer 485 can include a calibrator 487. The calibrator 487 can perform functions and operations that calibrate the movement data received from the controller 400 with the movement data obtained from the IMU interface 488 of the virtual reality computer system 450. In some embodiments, the calibrator 487 may perform these operations because the synchronizer 485 may manually align the orientation of the HMD 460 with the controller 102 (for example, using process 1150 described below with respect to FIG. 11B). The calibrator 487 may also perform these operations, in some instances, because the magnetic field affecting the controller 400 and/or the virtual reality computer system 450 can include noise and/or systematic perturbations from sources other than the Earth, where the noise and/or systematic perturbations experienced by the controller 400 and the IMU interface of the VR computer system 450 can differ from each other. For example, magnetic fields generated by electronic devices close to the controller 400 (e.g., within 1 m) may affect how the Earth's magnetic field acts on the controller 400. To perform calibration or manual alignment, the calibrator 487 may obtain movement data for the controller 400 when the controller 400 is pointing to a known target within the virtual environment rendered on display 462. In an operational example, the calibrator 487 may provide instructions to the processor 470 for rendering a calibration user interface element, such as a target, on the display 462 at a known location on display 462. The calibrator may also provide instructions to the processor 470 for rendering text instructions instructing the user to maneuver the pointer controlled by the controller 400 over the target and once the pointer is over the target, to activate an input button on the controller 400. When the user presses the input button on the controller 400, the virtual reality computer system 450 will receive an input event corresponding to the user activating the input button. In some embodiments, the input event will include the movement data of the controller 400 at the time the user presses the input button. Using the movement data received as part of the input event (or from movement data obtained from synchronizer 485) and the known location of the target rendered on the display, the calibrator 487 can determine a calibration value that accounts for any noise in the movement data of the controller 400 relative to the Earth. The synchronizer 485 can then use the calibration value when synchronizing the movement data received from the controller 400 and position orientation and data received from the IMU interface 488 of the virtual reality computer system 450.

While the above descriptions of the embodiments of the controller 400 and the virtual reality computer system 450 shown in FIG. 4 describe that certain functions and operations are performed by certain components (or logical blocks), in other embodiments, the functionality and operations of one component may be performed by another block to achieve the same overall function and operation of the controller 400 and the virtual reality computer system 450. As just one example, while the embodiment of the virtual reality computer system 450 depicted in FIG. 4 shows the synchronizer 485 as a separate logical block from VR application 480, in some embodiments, the functionality and operations of the synchronizer 485 can be included in the instructions that the VR application 480 provides to the processor 470 to render virtual environments. That a particular function or operation is described with respect to one component is used for the purposes of easing the discussion presented herein, and such descriptions do not limit the spirit and scope of the disclosed embodiments of the controller or the virtual reality computer system.

Figure 5A:
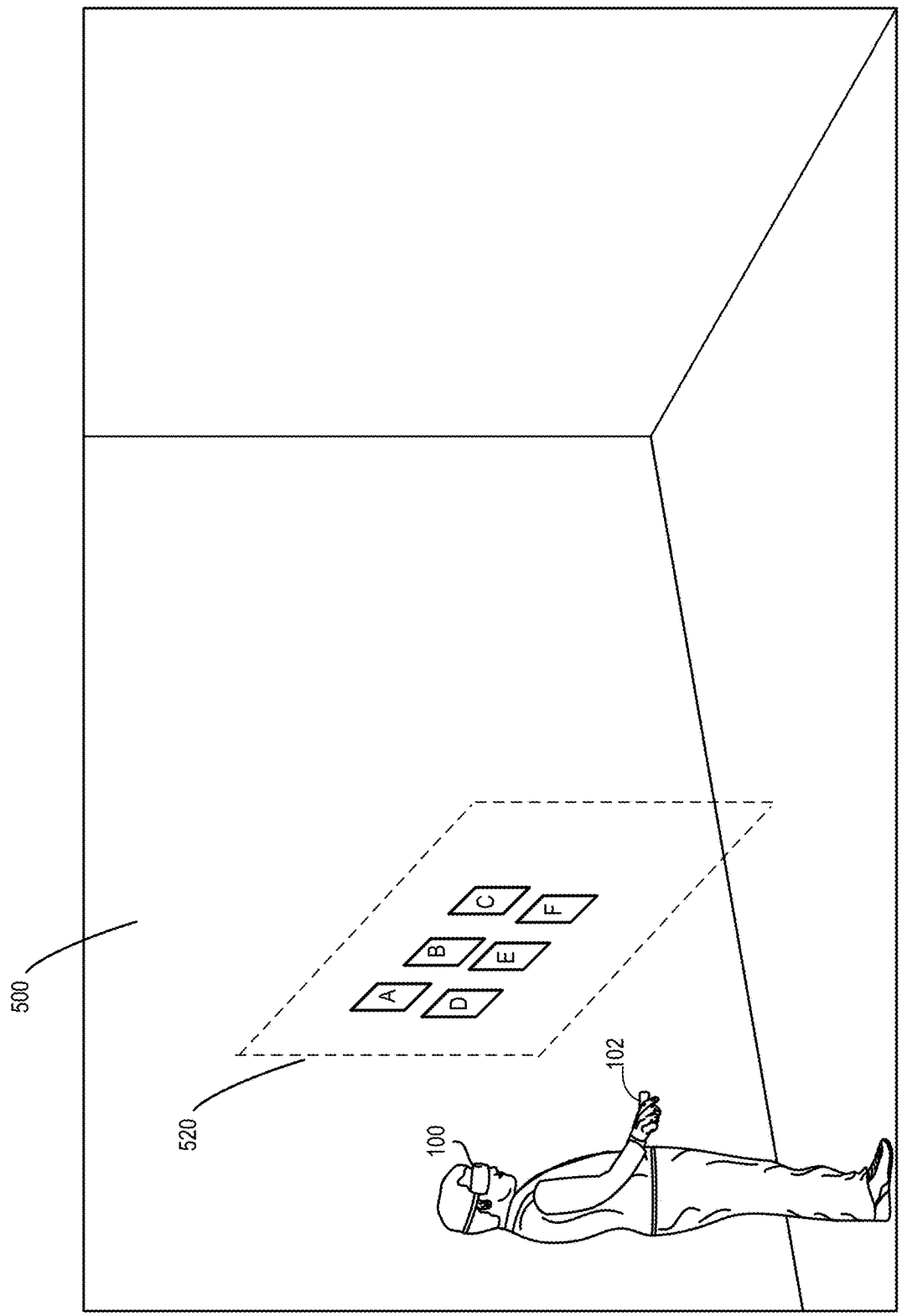

With reference to FIG. 5A, an example implementation of a system for combining movement input and touch input in an augmented reality and/or a virtual reality environment using a controller 102 is shown. FIG. 5A shows a third person view of a user in a physical space, wearing an HMD 100 and holding a controller 102, while viewing a virtual display 520 generated by the HMD 100, the virtual display displaying a plurality of virtual objects A, B, C, D, E and F. The user may choose to select one of the virtual objects A-F for interaction and/or manipulation and the like in numerous different manners such as, for example, directing a virtual beam 550 or ray from the controller 102 toward the object to be selected, directing a head gaze and/or eye gaze at the object to be selected, using the touch surface 108 of the controller 102 to navigate a virtual pointer to the object to be selected, and the like.

Figure 5B:
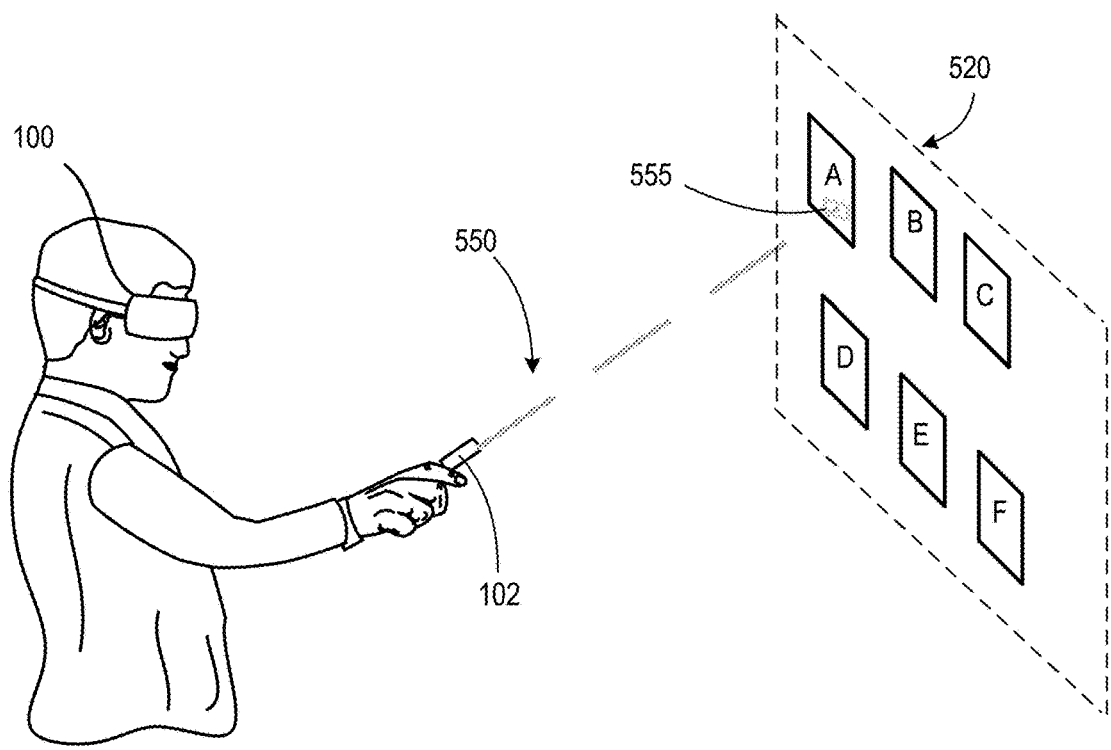

In the example shown in FIG. 5B, which is also a third person view of the user in the physical space, experiencing the virtual reality computer system rendering environment 500 generated by the HMD 100, the user directs a virtual beam 550 from the controller 102 toward virtual object A by, for example, manipulating the controller 102. In this example, the controller 102 may be equipped with gyromouse type capabilities, and/or may be otherwise equipped so that a 6DOF position and/or orientation of the controller 102 may be detected and tracked. As this 6DOF tracking may allow the system to detect and track position and/or orientation of the controller 102, the system may process the detected position and/or orientation to determine a terminal endpoint of the virtual beam 550, the terminal endpoint corresponding to an object or item to be selected by direction of the controller 102 in this manner. As the virtual beam 550 may not actually be visible to the user, in some implementations, a virtual indicator, such as a terminal end 555, may be displayed to the user to provide a visual indicator to the user prior to actual selection. The user may then select, for example, the object A, by manipulating the controller 102, such as, for example, tapping the touch surface 108, or pressing one of the input buttons 310, 320 of the controller 102.

Figure 5C:
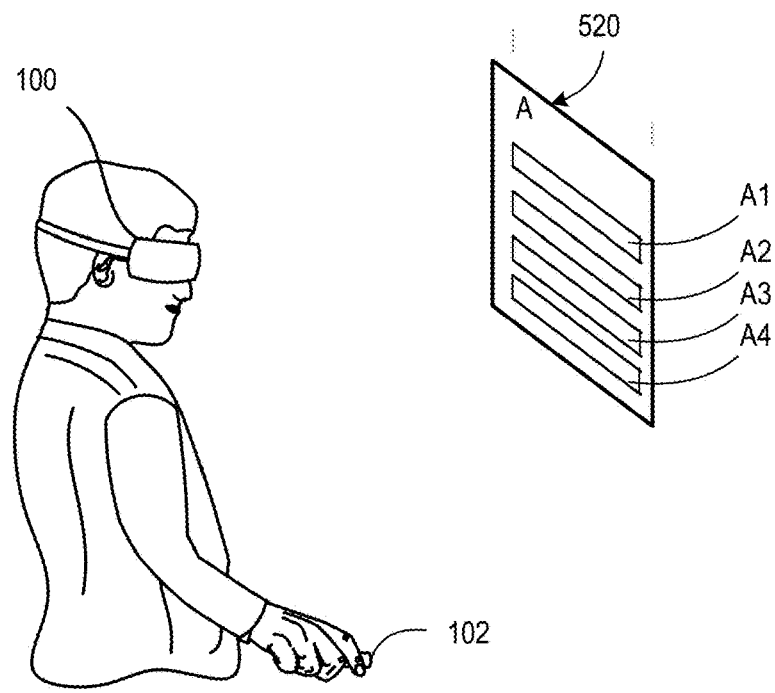

A number of different objects, features and options may be available in association with the virtual objects A-F. For example, a number n of different objects, and features may be available in association with the virtual object A. However, it may not be possible to view all of the virtual objects, features and the like, for example, features A1 through An all at the same time within the area of the virtual display 520 visible to the user due to, for example, the size of the virtual display area, the size of the virtual features A1-An, and other such factors. In one embodiment, in response to the selection of the virtual object A, the system may enlarge and display additional features A1, A2, A3 and A4, content and the like related to the object A in the virtual display 520, for interaction with and/or manipulation by the user, as shown in FIG. 5C. As some of the features, content and the like in addition to the features A1-A4 displayed to the user may exceed the area available for viewing by the user, the user may choose to scroll, navigate or move through the features, for example, to locate a desired feature, to view the features available for making a selection and the like.

Figure 6A:
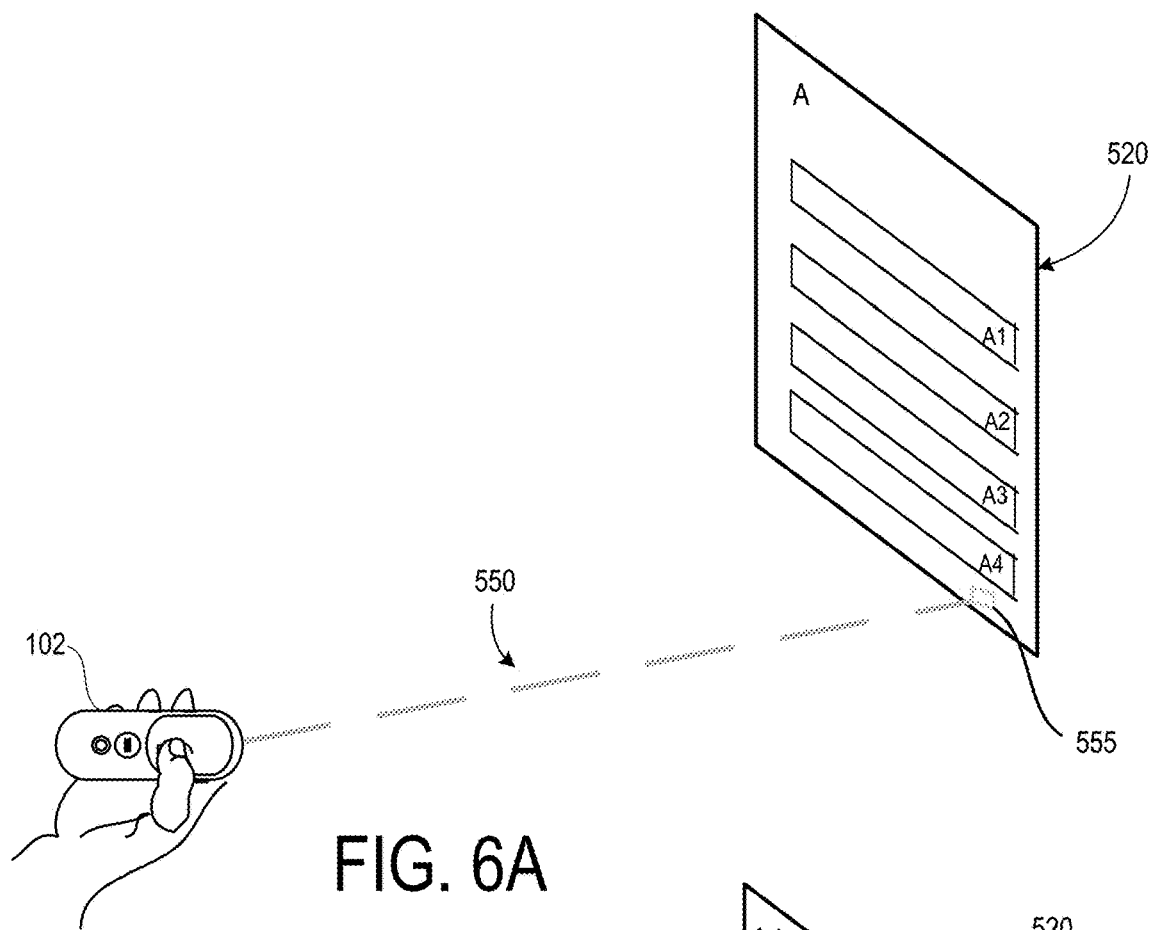
Figure 6B:
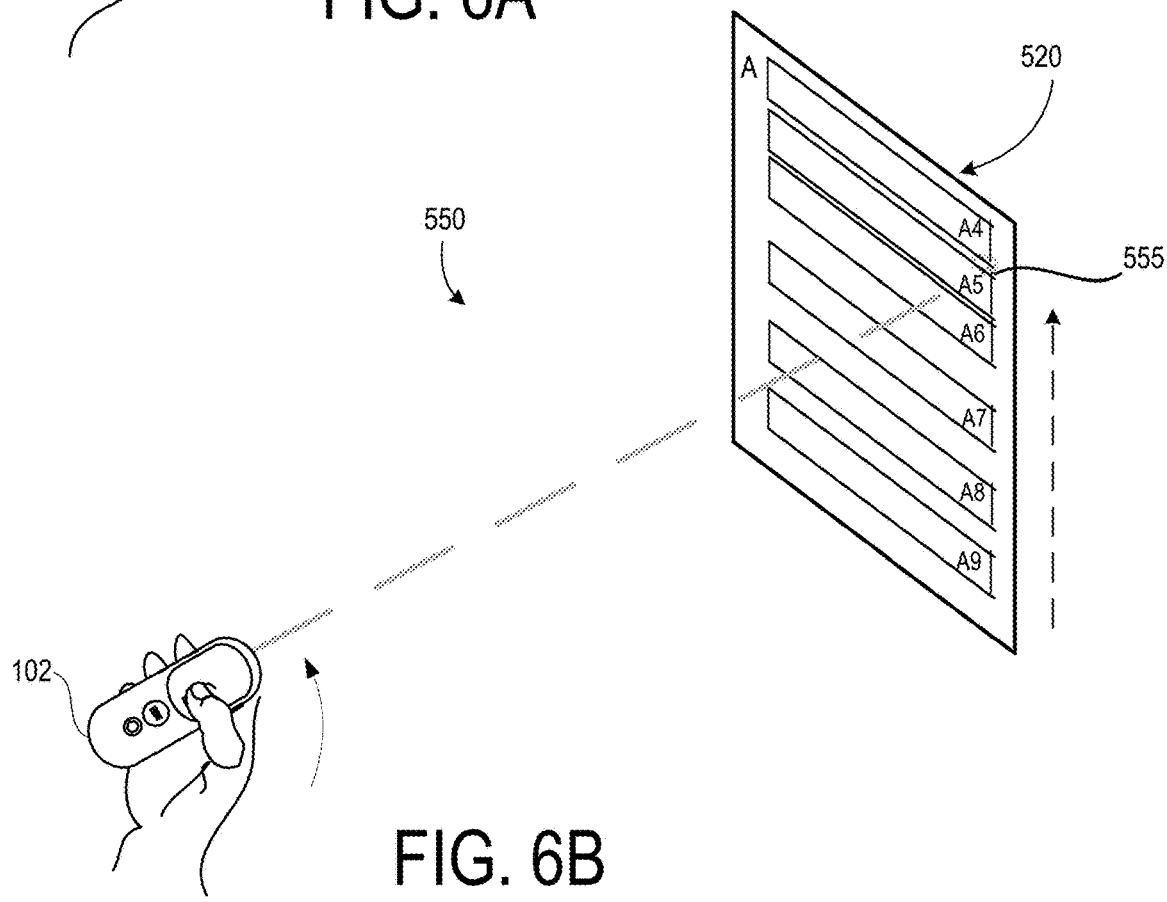
Figure 6C:
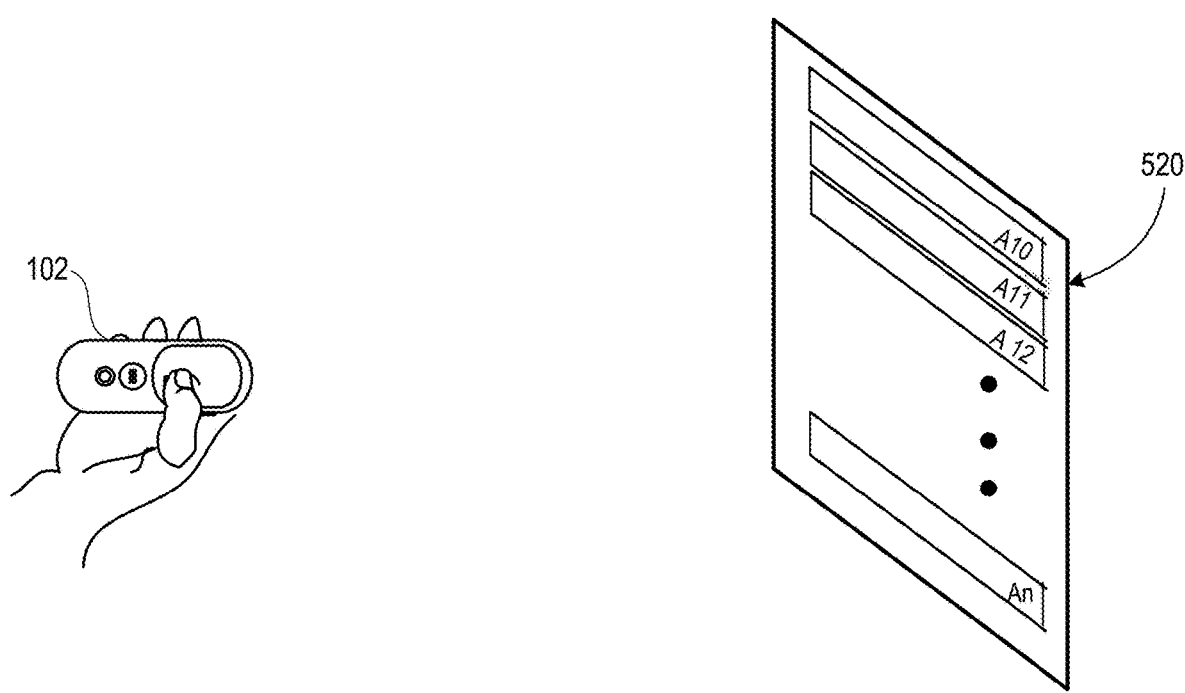

In some implementations, the user may cause movement of the features A1-An available in association with the selected virtual object A by, for example, pointing at the virtual display 520 to set an anchor point in a particular portion of the display area, and then implementing a physical movement of the controller 102, for example, a downward movement to cause the display of features to scroll downward or an upward movement to cause the display of features to scroll upward, and the like, as shown in FIGS. 6A-6C. FIGS. 6A-6C provide a third person view of the user (specifically, the user's hand, holding the controller 102) in the physical space, interacting with virtual content displayed by the HMD in the virtual environment.

The user may direct a virtual beam 550 at a portion of the virtual display 520 of the selected virtual object A, for example, a bottom portion of the display of the virtual object A, as shown in FIG. 6A. This selection input can set an anchor point at the portion of the display at which the terminal end 555 of the virtual beam 550 is positioned by, for example, a touch applied to the touch surface of the controller 102 or manipulation of one of the input buttons 310, 320. This anchor point may define a point from which the user may, for example, virtually grasp and hold a corresponding portion of the virtual display 520 for movement, manipulation, selection and the like. The user may then implement a physical upward movement of the controller 102, as shown in FIG. 6B, to cause the list of features A1-An associated with the selected virtual object A to scroll upwards. This upward movement may be sustained until, for example, the physical movement is terminated or changes direction, the touch on the touch surface 108 or depression of the input buttons 310, 320 is released as shown in FIG. 6C. Downward movement of the features A1-An associated with the selected virtual object A may be implemented by, for example, directing the virtual beam 550 at an upper portion of the display area and implementing a downward movement in a similar manner. Other movement, including scrolling, may be achieved in various other directions, such as in the left direction, the right direction, diagonal directions and the like in a similar manner.

In some instances, the user may, for example, inadvertently or unintentionally move the controller 102 while intentionally inputting a touch input on the touch surface 108 of the controller 102. Similarly, in some instances, the user may, for example, inadvertently or unintentionally move or drag along the touch surface 108 of the controller 102 while intentionally implementing a physical movement of the controller 102. To ensure that the system reacts to intended inputs, and not to unintentional inputs, in some implementations, a set of rules for responding to the various different types of inputs may be implemented by the system to facilitate the accurate selection of an particular virtual object or virtual feature and/or action to be taken in the virtual environment based on the detected inputs and the set of rules for operation. In some implementations, the rules for operation, and response to detected inputs, may be applied to any detected input. In some implementations, the rules for operation, and response to detected inputs, may be applied when a secondary input is detected while a primary input is detected. The rules for operation, and response to detected inputs may be based on, for example, user preferences, a type of controller in use, a particular virtual environment, a particular set of virtual objects, the movement of the controller 102, for example. In some implementations, the set of rules include a threshold value that when satisfied differentiate between an intended and unintentional input.

In the example shown in FIGS. 6A-6C, the selection input sets the anchor point in the virtual display area at the terminal end 555 of the virtual beam 550 is set by a touch input on the touch surface 108 of the controller 102, and scrolling of the features A1-An is implemented by the system in response to physical movement of the controller 102. If, during the physical movement of the controller 102 shown in FIG. 6B, the user were to inadvertently apply an unintended touch/drag on the touch surface 108 of the controller 102, the system may ignore the detected touch/drag on the touch surface 108, based on the set of rules. For example, in some implementations, the system may ignore the detected touch/drag on the touch surface 108 if the touch/drag remains within a pre-defined area 108A, which can be defined by a radius (e.g., the threshold value) from an initial touch point 108P of the touch surface 108. As shown in FIG. 9A, if a magnitude of the touch/drag input is less than the threshold, the touch/drag input may be unintentional. In some implementations, if the controller 102 (or in some embodiments the virtual reality computer system rendering environment 500) detects that the touch/drag has moved into an area 108B of the touch surface 108—outside of area 108A—the controller 102 (or in some embodiments the virtual reality computer system rendering environment 500) may determine that the touch/drag input was intentional. In some implementations, the pre-defined area 108A on the touch surface 108 may be based on, for example, a set area surrounding an initial touch point 108P on the touch surface 108 associated with the input. That is, if the initial touch point 108P on the touch surface 108 is located as shown in FIG. 9B, rather than as shown in FIG. 9A, the pre-defined area 108A may be based on the location of the initial touch point 108P.

Figure 7A:
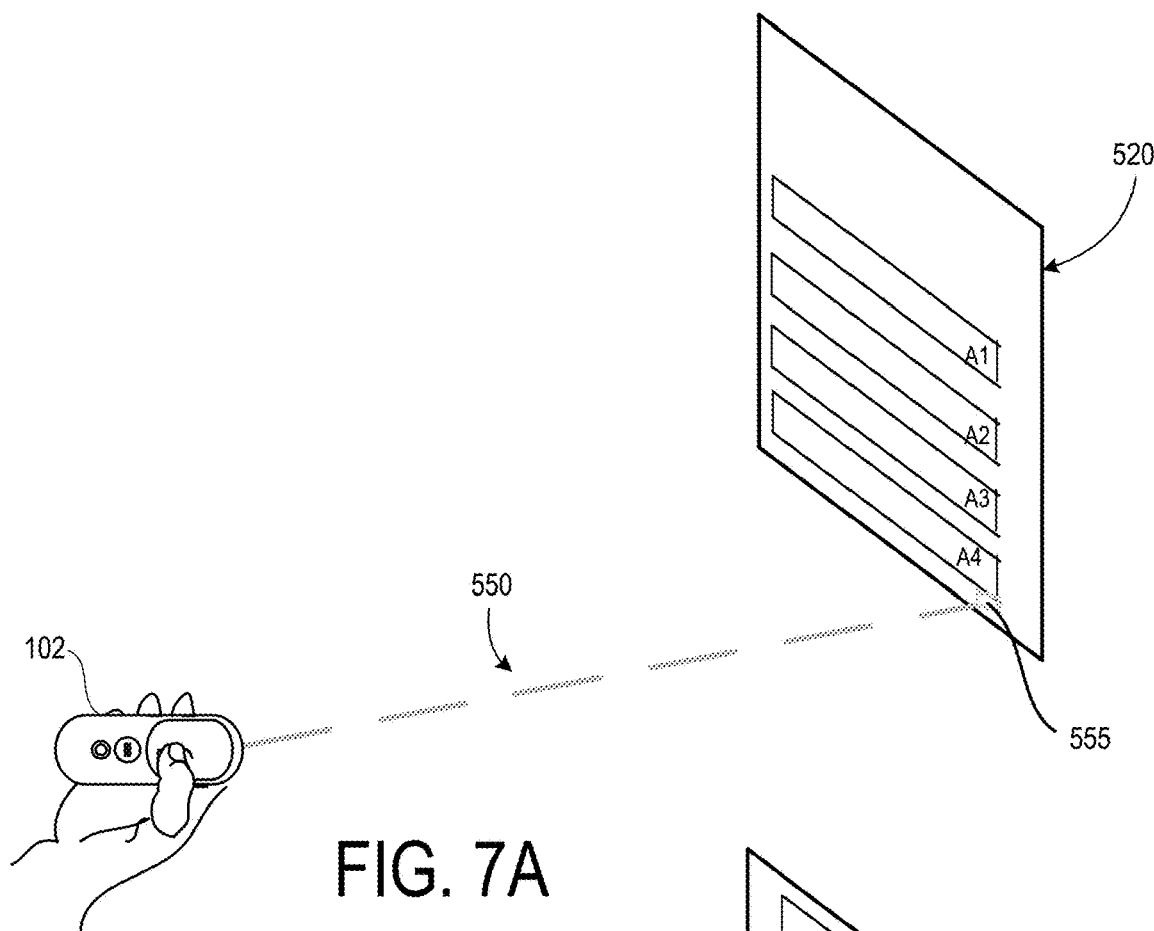
Figure 7B:
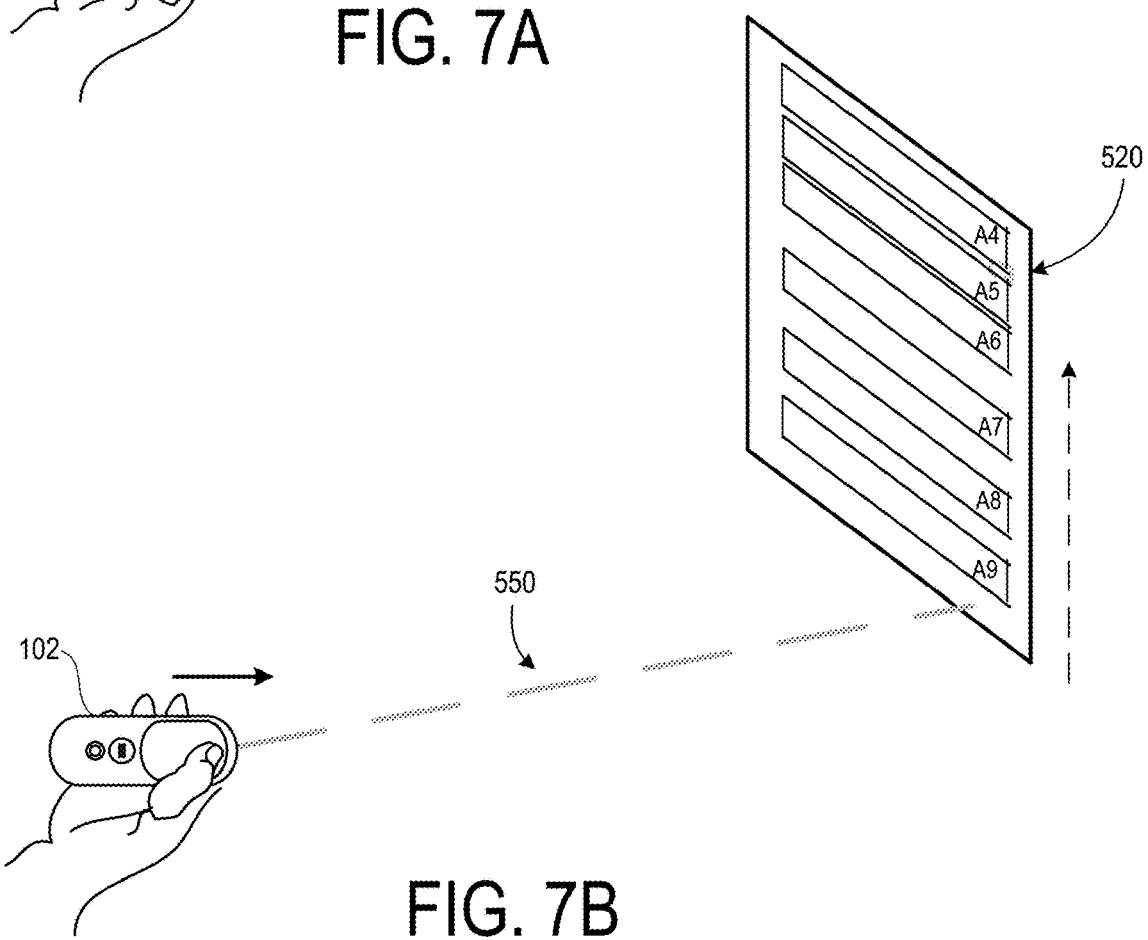
Figure 7C:
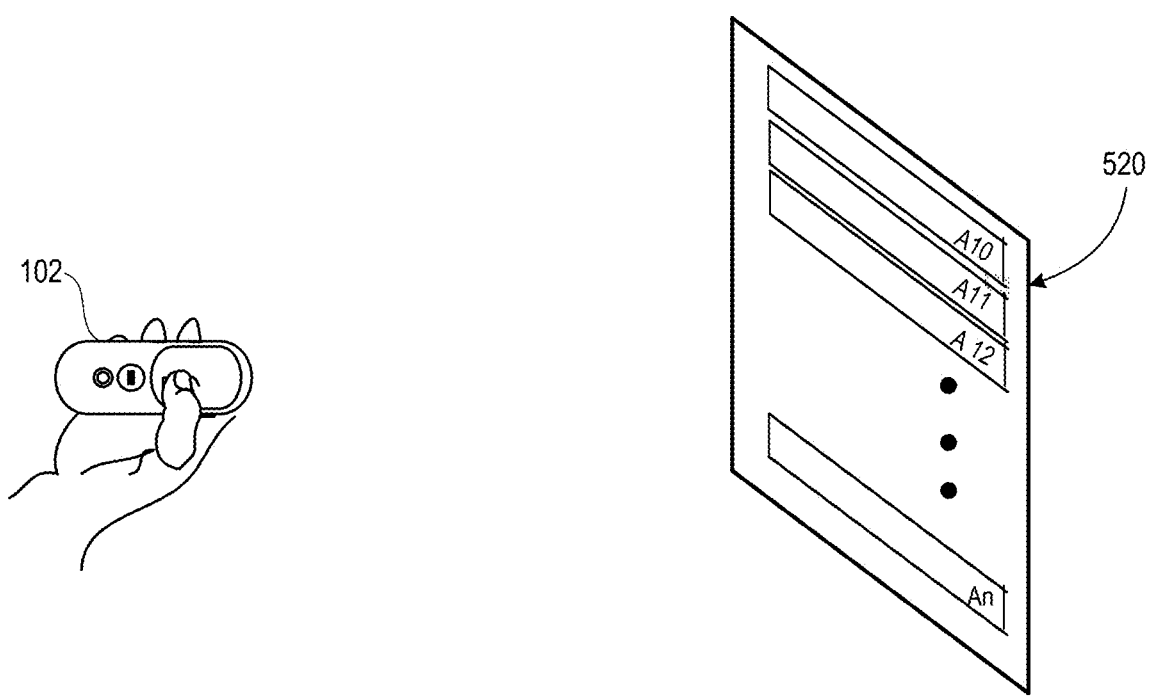

In some implementations, the user may cause movement of the features A1-An available in association with the selected virtual object A by, for example, inputting a selection input by pointing at the display area to set an anchor point, and then implementing a touch and drag input on the touch surface 108 of the controller 102, for example, a downward drag on the touch surface 108 to cause the display of features to scroll downward or an upward drag on the touch surface 108 to cause the display of features to scroll upward, and the like, as shown in FIGS. 7A-7C. FIGS. 7A-7C provide a third person view of the user (specifically, the user's hand, holding the controller 102) in the physical space, interacting with virtual content displayed by the HMD in the virtual environment.

According to some embodiments, the user may direct a virtual beam 550 at a portion of the virtual display 520 of the selected virtual object A, for example, a bottom portion of the display of the virtual object A, as shown in FIG. 7A. This may set an anchor point at the portion of the display at which the terminal end 555 of the virtual beam 550 is positioned by, for example, a touch applied to the touch surface of the controller 102 or the manipulation of one of the input buttons 310, 320. The user can then input a drag movement along the touch surface 108 of the controller 102, as shown in FIG. 7B, to cause the list of features A1-An associated with the selected virtual object A to scroll upwards. This upward movement may be sustained until, for example, the drag input is terminated or changes direction, the touch on the touch surface 108 or depression of the input buttons 310, 320, and the like, as shown in FIG. 7C. Downward movement of the features A1-An associated with the selected virtual object A may be implemented by, for example, directing the virtual beam 550 at an upper portion of the display area and implementing a downward drag input on the touch surface 108 of the controller 102 in a similar manner. Other movement, including scrolling, may be achieved in various other directions, such as in the left direction, the right direction, diagonal directions and the like in a similar manner. According to some embodiments, the virtual reality computer system may set an anchor point based on the position of the terminal end 555 of the virtual beam 550 when it detects a touch input generated by, for example, a drag movement along the touch surface 108, even though the user has not pressed one of input buttons 310, 320.

As noted above, in some instances, the user may, for example, inadvertently or unintentionally move the controller 102 while intentionally inputting a touch input on the touch surface 108 of the controller 102. If, during the input of the touch and drag input on the touch surface 108 of the controller 102 shown in FIG. 7B, the user were to inadvertently implement a physical movement or gesture with the controller 102, the system may ignore the detected physical movement of the controller 102, based on a set of pre-defined rules for responding to the various different types of inputs, so that only the intended input causes an action to be carried out in the virtual environment. For example, in some embodiments, the controller 102 (or in some embodiments the virtual reality computer system rendering environment 500) may ignore a detected physical movement of the controller 102 if, for example, a magnitude or direction of the detected physical movement of the controller 102, from a position P1 to a position P2, is less than a pre-defined threshold D1 or within a predefined range D1, as shown in FIG. 9C, indicating the physical movement of the controller 102 was unintentional. In some implementations, if the controller 102 (or in some embodiments the virtual reality computer system rendering environment 500) detects that the magnitude of the physical movement of the controller 102, from the position P1 to the position P2, exceeds the pre-defined range D1, as shown in FIG. 9D, the controller 102 or the virtual reality system may determine that the physical movement of the controller 102 was intentional.

In some implementations, the user may cause movement of the features A1-An available in association with the selected virtual object A by, for example, manipulating a virtual vertical scroll bar 860 and/or a virtual horizontal scroll bar 870 displayed in the display area, as shown in FIGS. 8A-8F. FIGS. 8A-8F provide a third person view of the user (specifically, the user's hand, holding the controller 102) in the physical space, interacting with virtual content displayed by the HMD in the virtual environment.

Figure 8A:
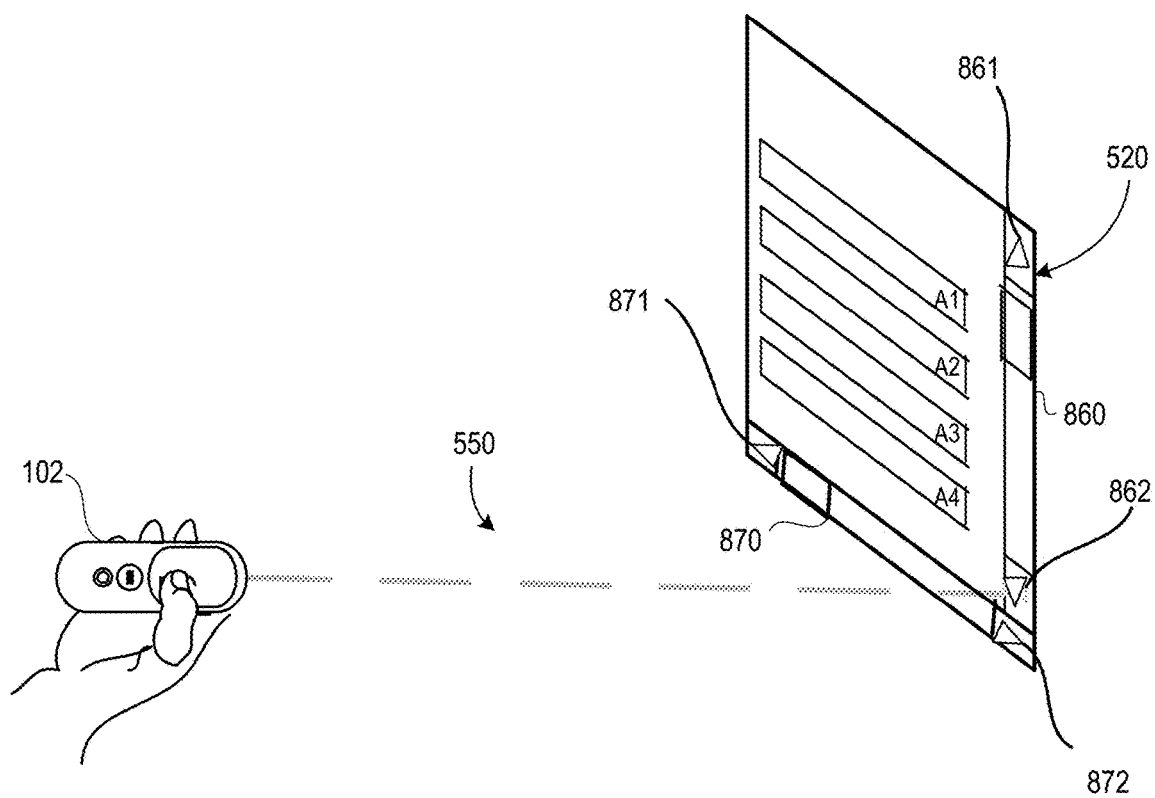
Figure 8B:
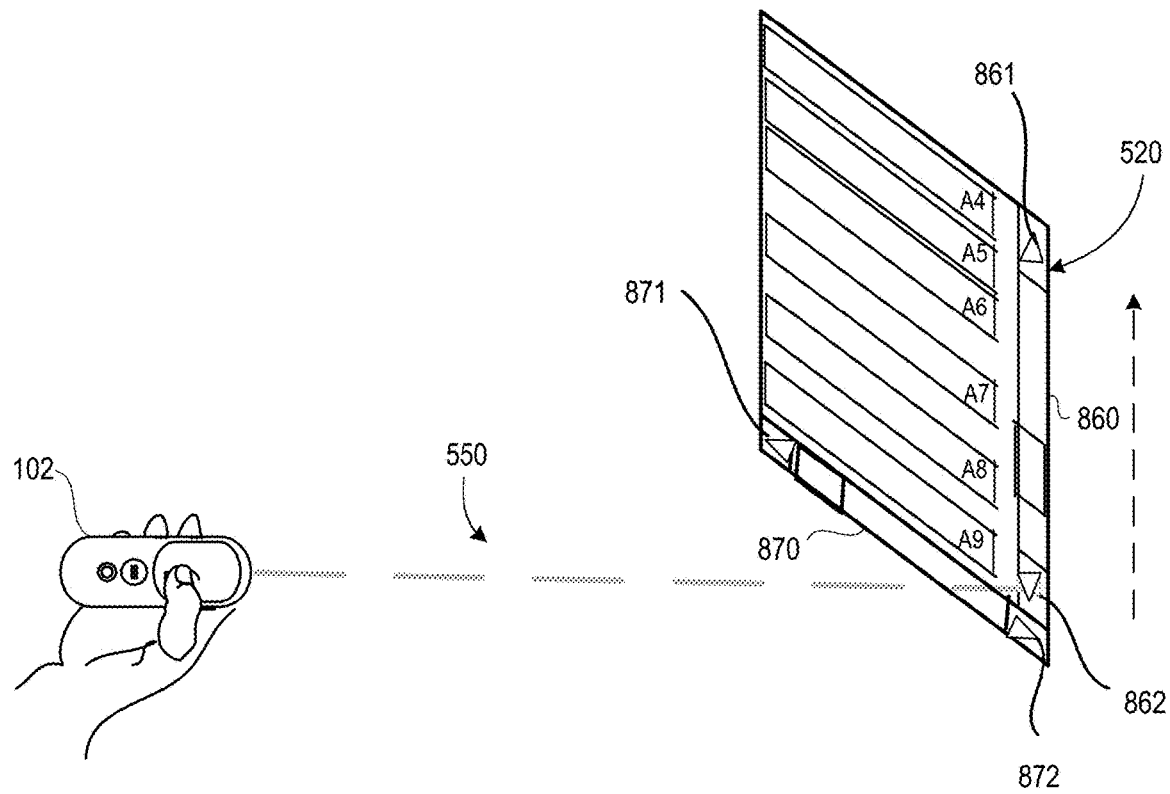
Figure 8C:
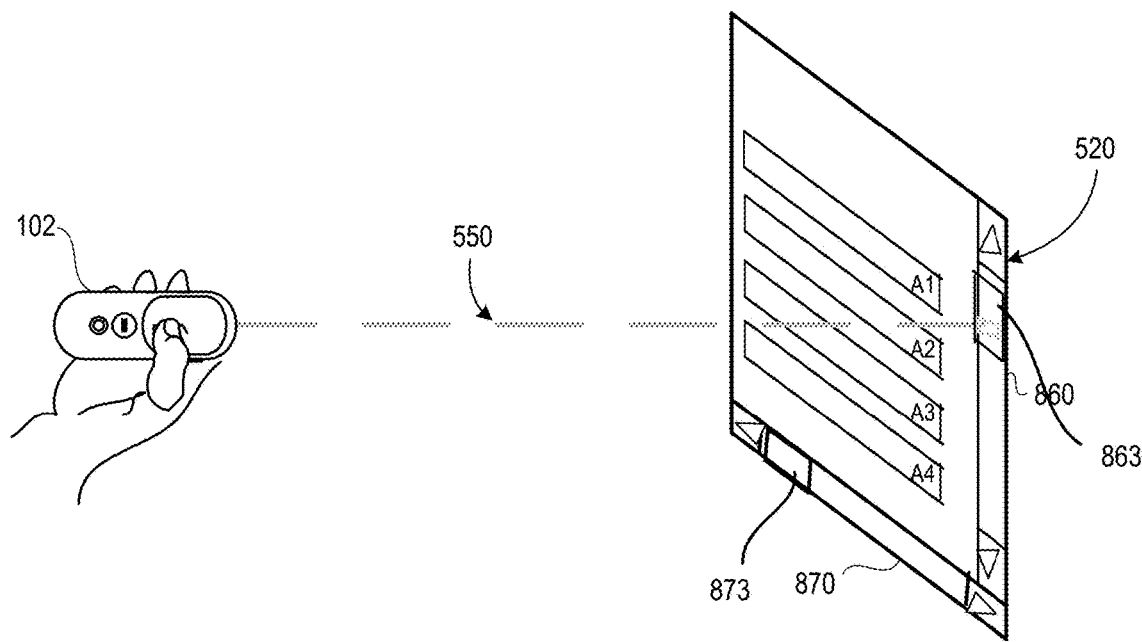
Figure 8D:
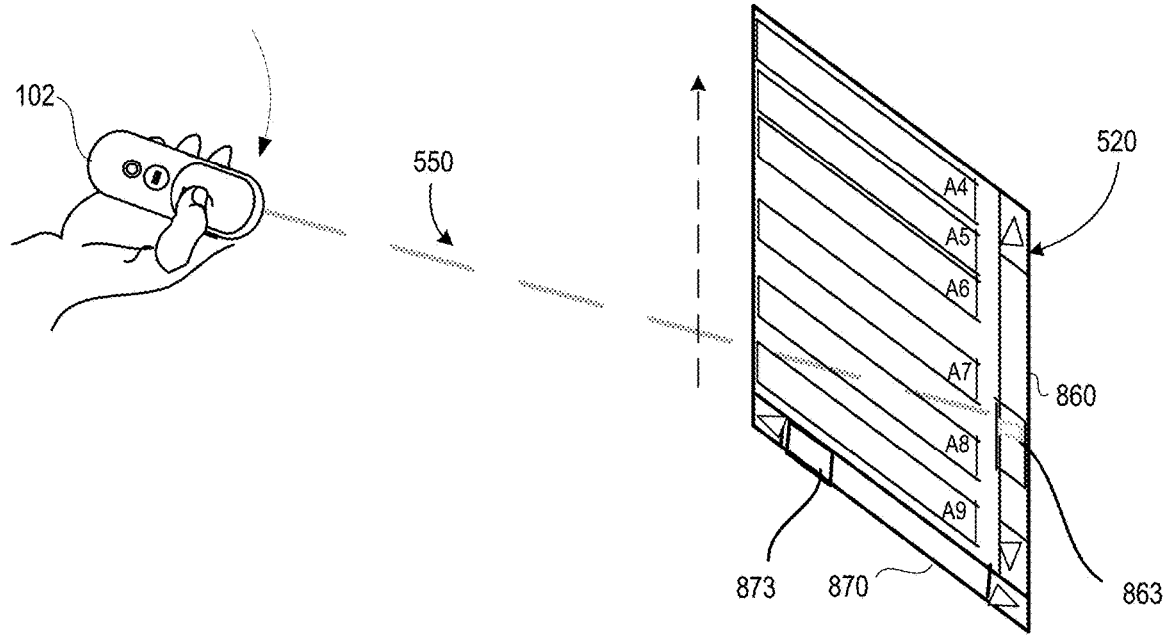
Figure 8E:
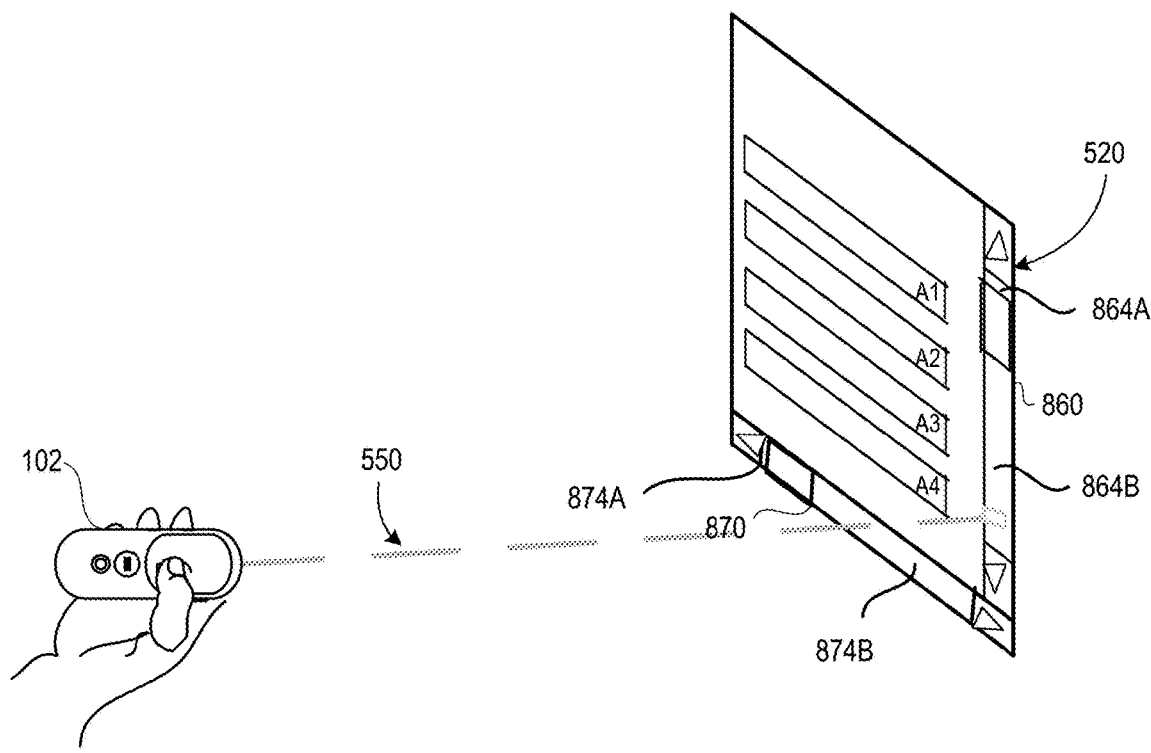
Figure 8F:
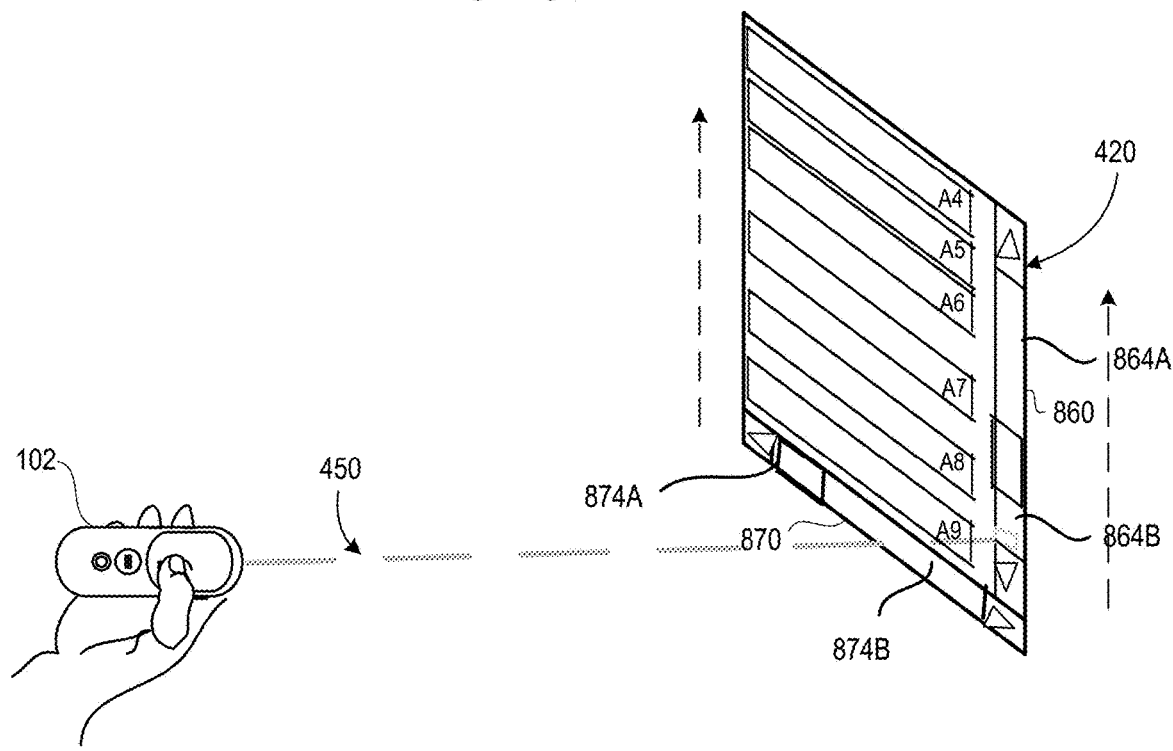

In some implementations, the user may input a selection input by pointing and selecting a virtual up arrow 861, a virtual down arrow 862, a virtual left arrow 871, or a virtual right arrow 872 to generate a corresponding movement of the features A1-An. In the example shown in FIG. 8A, the user directs a virtual beam 550 at a portion of the display of the selected virtual object A, for example, the down arrow 862 in the vertical scroll bar 860, and selects the down arrow 862 for input by, for example, a touch applied to the touch surface of the controller 102 or manipulation of one of the input buttons 310, 320. The user may then virtually select (e.g., click) the down arrow 862 by, for example, one or more touch inputs applied to the touch surface 108 of the controller 102, one or more depressions of one of the input buttons 310, 320, as shown in FIG. 8B, to cause the list of features A1-An associated with the selected virtual object A to scroll. Downward movement of the features A1-An associated with the selected virtual object A may be implemented by, for example, directing the virtual beam 550 at the upper arrow 861 in the vertical scroll bar 860 of the display area and virtually selecting (e.g., clicking on) the up arrow 861 as described above. Movement of the features A1-An associated with the selected virtual object A in other directions, for example, to the left and the right, may be implemented by, for example, directing the virtual beam 550 at the left arrow 871 or the right arrow 872 in the horizontal scroll bar 870 of the display area and virtually selecting (e.g., clicking on) the selected arrow 871/872 as described above to generate movement of the features A1-An in a corresponding direction. A set of pre-defined rules, as discussed above in detail with respect to FIGS. 9A-9D, may be applied to the detection of the various inputs described above with respect to FIGS. 8A-8B, so that the system takes action in response to intended inputs, rather than unintended inputs.

In some implementations, similar movement may be achieved by virtual movement of a virtual vertical indicator 863 in the virtual vertical scroll bar 860 and/or movement of a virtual horizontal indicator 873 in the virtual horizontal scroll bar 870 to generate a corresponding movement of the features A1-An. This may, essentially set an anchor point at the portion of the display at which the terminal end 555 of the virtual beam 550 is positioned (in this example, on the vertical indicator 863 in the vertical scroll bar 860) by, for example, a touch applied to the touch surface of the controller 102 or manipulation of one of the input buttons 310, 320, and the like. As shown in FIG. 5D, the user may then input a drag movement along the touch surface 108 of the controller 102, or implement a physical movement of the controller 102 as described above, to cause the list of features A1-An associated with the selected virtual object A to scroll. This movement may be sustained until, for example, the drag input is terminated or changes direction, the physical movement of the controller 102 is terminated or changes direction, the touch on the touch surface 108 or depression of the input buttons 310, 320 is released, and the like. Downward movement of the features A1-An associated with the selected virtual object A may be implemented by, for example, directing the virtual beam 550 at the vertical indicator 863 in the vertical scroll bar 860 and implementing a downward drag input on the touch surface 108 of the controller 102, or implementing a downward physical movement of the controller 102, in a similar manner. Movement of the features A1-An associated with the selected virtual object A in other directions, for example, to the left and the right, may be implemented by, for example, directing the virtual beam 550 at the horizontal indicator 873 in the horizontal scroll bar 870 of the display area and implementing a drag input in the left or right direction on the touch surface 108 of the controller 102, or implementing a physical movement of the controller 102 in the left or right direction, in a similar manner to generate movement of the features A1-An in a corresponding direction. A set of pre-defined rules, as discussed above in detail with respect to FIGS. 9A-9D, may be applied to the detection of the various inputs described above with respect to FIGS. 5C-5D, so that the system takes action in response to intended inputs, rather than unintended inputs.

In some implementations, similar movement may be achieved by input(s) applied in areas 864A/864B above or below the virtual vertical indicator 863 and/or input(s) applied in areas 874A/874B to the right or left of the virtual horizontal indicator 873 to generate a corresponding movement of the features A1-An. In the example shown in FIG. 5E, the user directs a virtual beam 550 at a portion of the display of the selected virtual object A, for example, the area 864B in the vertical scroll bar 860, and selects the area 864B for input by, for example, a touch applied to the touch surface of the controller 102 or manipulation of one of the input buttons 310, 320, and the like. The user may then virtually select (e.g., click) the down arrow 862 by, for example, one or more touch inputs applied to the touch surface 108 of the controller 102, one or more depressions of one of the input buttons 310, 320 and the like, as shown in FIG. 5F, to cause the list of features A1-An associated with the selected virtual object A to scroll. Downward movement of the features A1-An associated with the selected virtual object A may be implemented by, for example, directing the virtual beam 550 at the area 864A in the vertical scroll bar 860 of the display area and virtually selecting (e.g., clicking on) the area 864A as described above. Movement of the features A1-An associated with the selected virtual object A in other directions, for example, to the left and the right, may be implemented by, for example, directing the virtual beam 550 at one of the areas 874A or 874B in the horizontal scroll bar 870 of the display area and virtually selecting (e.g., clicking on) the selected area 874A or 874B as described above to generate movement of the features A1-An in a corresponding direction. A set of predefined rules, as discussed above in detail with respect to FIGS. 9A-9D, may be applied to the detection of the various inputs described above with respect to FIGS. 8E-8F, so that the system takes action in response to intended inputs, rather than unintended inputs.

The example systems and methods have been described above with respect to moving and/or scrolling various virtual items and or features included in virtual lists, menus and the like displayed in an augmented and/or virtual reality environment, simply for ease of discussion and illustration. However, similar principles may be applied in navigating situations in which items, features and the like exceed an available space for display, and may also be applied to scaling, zooming in and/or out, volume control and other such features.

Figure 10:
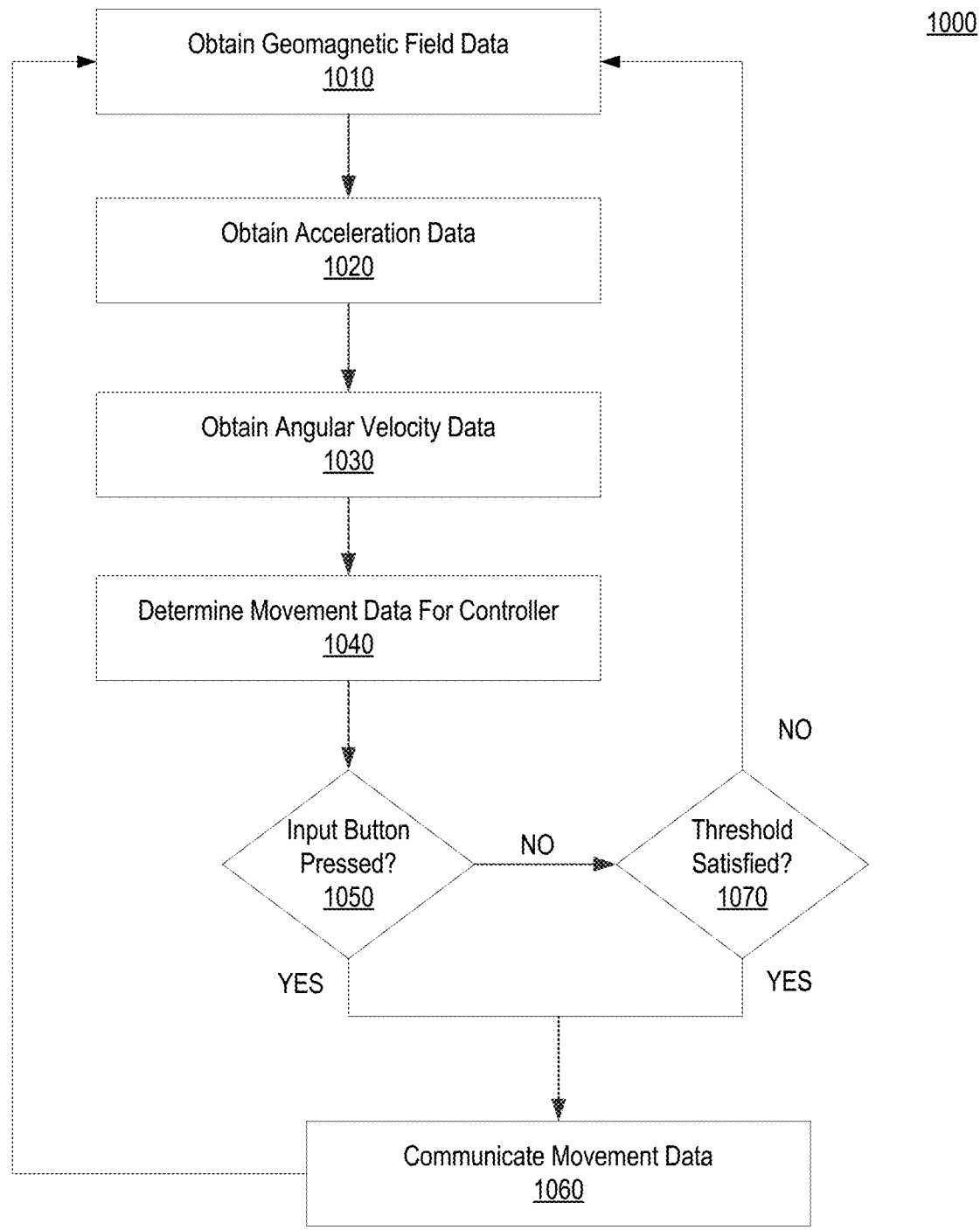
FIG. 10 shows a flow chart for an example process for controlling a pointer in a virtual reality environment consistent with disclosed embodiments.

FIG. 10 shows a flowchart representing an example process 1000 for controlling a pointer in a virtual reality environment consistent with disclosed embodiments. According to some embodiments, process 1000 can be performed by one or more components of a controller, such as for example, the controller 102, 400. For example, process 1000 can be performed by the IMU interface 432 (e.g., the processor 440 of the controller 400 executes the instructions of the IMU interface 432 to perform the operations and functions of the IMU interface 432). Although the following discussion below describes process 1000 as being performed by an IMU interface of a controller, other components of a controller configured to control virtual environments can perform process 1000 without departing from the spirit and scope of the present disclosure. In addition, according to some embodiments, not all steps of process 1000 may be performed. For example, step 1010 may not be performed in embodiments where controller 102 does not include a magnetic field sensor.

According to some embodiments, the IMU interface process 1000 begins at step 1010 where it obtains geomagnetic field data from the magnetic field sensor of the controller in which the IMU interface is deployed. The geomagnetic field data may describe the effect of the Earth's magnetic field on the controller. In some instances, the geomagnetic field data can also include noise and static perturbations created from other magnetic fields acting on the controller. These magnetic fields may come from, for example, other electronic devices that are within close proximity (e.g., 1 or 2 m) to the controller. As a result, in some embodiments, the IMU interface may perform one or more smoothing operations to the geomagnetic field data before determining the movement data of the controller at step 1040.

IMU interface continues execution of process 1000 at step 1020 where it obtains acceleration data from the accelerometer of the controller in which the IMU interface is deployed. In some embodiments, the acceleration data can describe the direction and the magnitude of force affecting the controller. For example, the acceleration data can describe the linear acceleration and/or gravitational force acting on the controller. At step 1030, the IMU interface can obtain angular velocity data from the gyroscope of the controller in which the IMU interface is deployed. The angular velocity data can describe for example, the rotational position of the controller in space.

In some embodiments, the data obtained from the magnetic field sensor, the accelerometer, and the gyroscope at steps 1010, 1020, 1030 may be raw data that has not been processed or smoothed in any way other than what may be available directly from the hardware of the sensors. Accordingly, at step 1040, the IMU interface may determine movement data for the controller by processing and/or smoothing the raw data. In some embodiments, this determination of the movement data provides for easy consumption by virtual reality computer systems, for example as was described in more detail above with respect to the IMU interface 432 of FIG. 4.

As mentioned above, in some embodiments the controller may send movement data to the virtual reality computer system responsive to detecting that one of its input buttons have been pressed. If the IMU interface determines that one of the controller's input buttons have been pressed (step 1050: YES), then the IMU interface may communicate movement data via a wireless communication circuit to the virtual-reality computer system. If, however, the IMU interface determines that no input button of the controller has been pressed (step 1050: NO), it may determine whether to communicate the movement data to the virtual reality computer system based on whether a threshold has been satisfied, as described in more detail above with respect to FIG. 4. If the threshold has been satisfied (step 1070: YES) then the IMU interface may communicate the movement data to the virtual reality computer system via a wireless communication circuit deployed within the controller. On the other hand, if the threshold has not been satisfied (step 1070: NO) then the IMU interface continues execution of process 1000 by returning to step 1010 where it obtains the geomagnetic field data.

Figure 11:
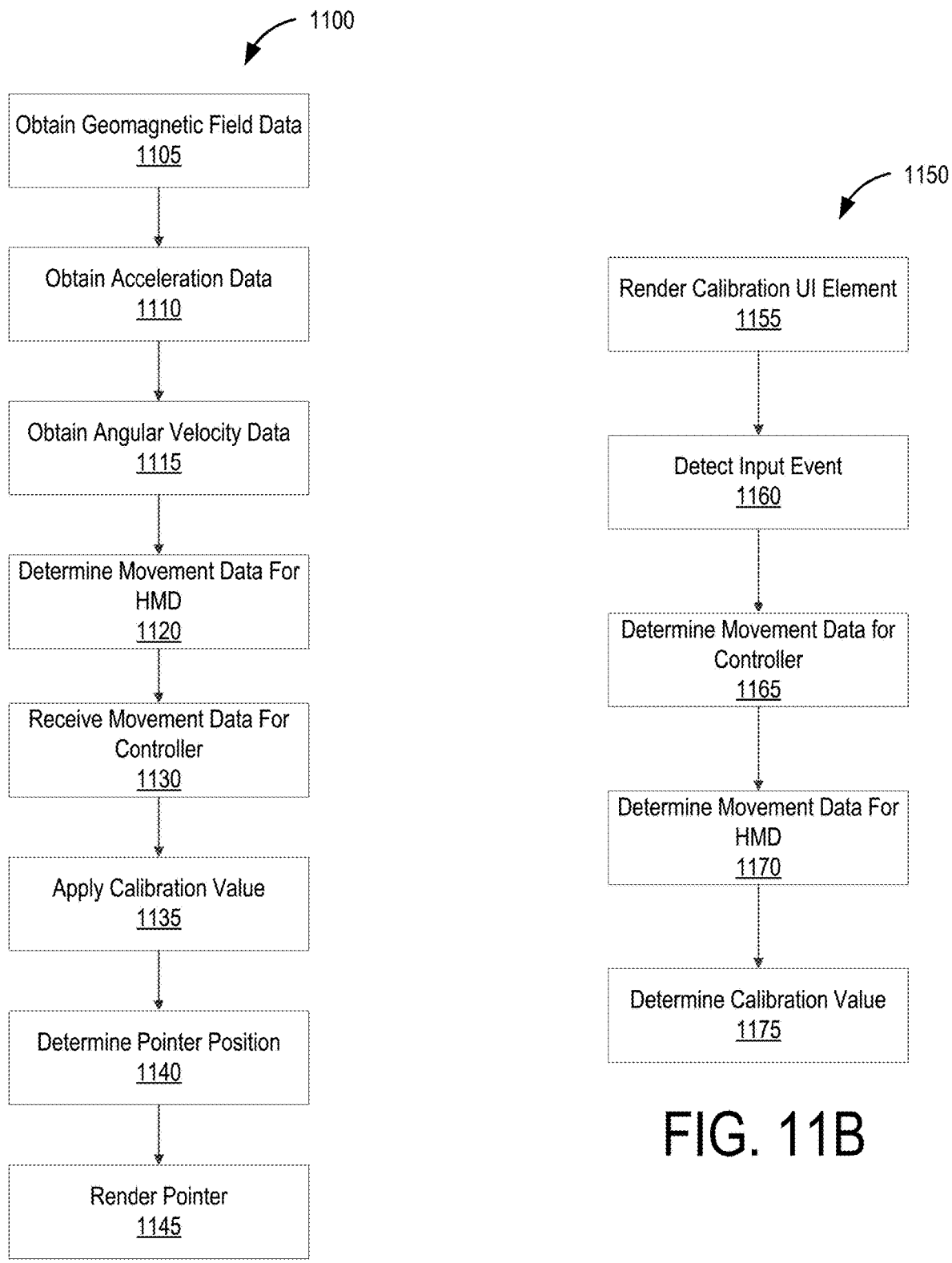
FIGS. 11A and 11B show flow charts for example processes for providing a pointer in a virtual reality environment consistent with disclosed embodiments.

FIG. 11A shows a flowchart representing an example process 1100 for providing a pointer in a virtual reality environment. According to some embodiments, process 1100 can be performed by one or more components of a virtual reality computer system, such as for example, the virtual reality computer system 450. For example, process 1100 can be performed by the synchronizer 485 of virtual reality computer system 450 (e.g., the processor 470 of the virtual reality computer system 450 executes the instructions of the synchronizer 485 to perform the operations and functions of the synchronizer 485). Although the following discussion below describes process 1100 as being performed by a synchronizer, other components of a virtual reality computer system can perform process 1100 without departing from the spirit and scope of the present disclosure. In addition, not all steps of process 1100 are performed in all embodiments. For example, step 1105 may not be performed in embodiments where the virtual reality computer system, or its HMD, does not include a magnetic field sensor.

According to some embodiments, the synchronizer begins process 1100 at step 1105 where it obtains geomagnetic field data from the magnetic field sensor of the HMD in communication with the synchronizer. The geomagnetic field data may describe the effect of the Earth's magnetic field on the controller. In some instances, the geomagnetic field data can also include noise created from other magnetic fields acting on the controller. These magnetic fields may come from, for example, other electronic devices that are within close proximity (e.g., 1 or 2 m) to the controller. As a result, in some embodiments, the synchronizer may communicate with an IMU interface that may perform one or more smoothing operations to the geomagnetic field data before determining the movement data of the HMD at step 1120.

Synchronizer continues execution of process 1100 at step 1110 where it obtains acceleration data from the accelerometer of the HMD in communication with the synchronizer. In some embodiments, the acceleration data can describe the direction and the magnitude of force affecting the HMD. For example, the acceleration data can describe the linear acceleration and/or gravitational force acting on the HMD. At step 1115, the synchronizer can obtain angular velocity data from the gyroscope of the controller in communication with the synchronizer. The angular velocity data can describe for example, the rotational position of the HMD in space.

In some embodiments, the data obtained from the magnetic field sensor, the accelerometer, and the gyroscope at steps 1105, 1110, 1115 may be raw data that has not been processed or smoothed in any way other than what may be available directly from the hardware of the sensors. Accordingly, at step 1120, the synchronizer may communicate with an IMU interface to determine the movement data for the HMD by processing and/or smoothing the raw data as described in more detail above with respect to the IMU interfaces 432, 488 of FIG. 4.

According to some embodiments, the synchronizer continues execution of process 1100 at step 1125 by receiving movement data for a controller that may be used by a user to control aspects of the virtual environment being rendered by the virtual reality computer system in which the synchronizer is deployed. Before providing the pointer position, the synchronizer may apply a calibration value at step 1135 to either the movement data determined for the HMD at step 1120 or the movement data for the controller received at step 1125. The calibration value may be determined based on the process 1150 described below with respect to FIG. 11B.

Next, at step 1140 the synchronizer may use the movement data for the controller received at step 1125, the movement data for the HMD determined at step 1120, and the calibration value applied at step 1135, to determine a pointer position at which the virtual reality computer system will render the pointer. After the synchronizer determines the pointer position, it may communicate the pointer position to one or more VR applications executing on the virtual-reality computer system. The VR applications can send instructions to the processor of the virtual-reality computer system, at step 1145, to render the pointer at the pointer position.

FIG. 11B shows a flowchart representing an example process 1150 for providing a pointer in a virtual reality environment. More specifically, process 1150 can determine a calibration value that can be used by process 1100 at step 1135, for example, to provide the pointer. According to some embodiments, the process 1150 can be performed by one or more components of a virtual reality computer system, such as for example, the virtual reality computer system 450. For example, the process 1150 can be performed by the calibrator 487 of the synchronizer 485 of the virtual reality computer system 450 (e.g., the processor 470 of the virtual reality computer system 450 executes the instructions of the calibrator 487 to perform the operations and functions of calibrator 487). Although the discussion below describes the process 1150 as being performed by a calibrator, other components of a virtual reality computer system can perform process 1150 without departing from the spirit and scope of the present disclosure.

According to some embodiments, the calibrator begins step 1150 by providing instructions to a VR application executing on the virtual reality computer system to render a calibration user interface element. The calibration user interface element can be, for example, a target or other virtual object at which the user may direct a pointer controlled by the controller. In some embodiments, the calibration user interface element can include text instructions telling the user to direct the pointer to the calibration user interface element. The text instructions may also tell the user to press one of the input buttons on the controller once the user aligns the pointer on the target portion of the calibration user interface element. When the user selects the input button, the controller may send an input event to the virtual reality computer system which can be detected by the calibrator at step 1160.

In some embodiments, the input event communicated to the virtual reality computer system includes the movement data of the controller. For example, as discussed above with respect to FIG. 10, the IMU interface may communicate the position orientation data to the virtual-reality computer system responsive to detecting that an input button has been pressed. In such embodiments, when the calibrator detects the input event, it may extract or determine the movement data of the controller from the input event (at step 1165). In some embodiments, when the calibrator detects the input event, it may communicate with the synchronizer of the virtual reality computer system to obtain the current movement data of the controller (also, at step 1165). According to some embodiments, the calibrator may also obtain, from the synchronizer, the movement data for the HMD of the virtual-reality computer system at step 1170.

At step 1175, the calibrator can determine the calibration value. In some embodiments, the calibrator can use the movement data for the controller, the position orientation data for the HMD, and the known location of the rendered calibration user interface element to determine a calibration value. For example, the calibration value can be used when synchronizing received information, including, but not limited to, synchronization of movement data, orientation data and/or data received from an IMU interface.

Figure 12:
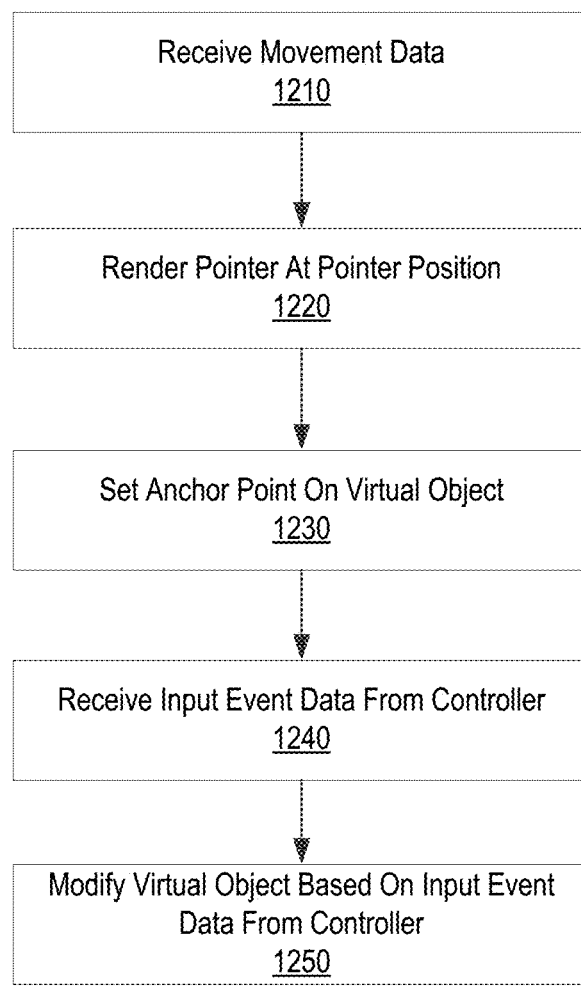
FIG. 12 shows a flow chart for an example process for manipulating objects in a virtual reality environment consistent with disclosed embodiments.

FIG. 12 shows a flowchart representing an example process 1200 for manipulating a virtual object in a virtual environment. According to some embodiments, the process 1200 can be performed by one or more components of a virtual reality computer system, such as for example, the virtual reality computer system 450. For example, the process 1200 can be performed by one of the synchronizer 485 or the VR applications 480 of the virtual reality computer system 450 (e.g., the processor 470 of the virtual reality computer system 450 executes the instructions of the synchronizer 485 or the VR applications 480 to perform the operations and functions of the synchronizer 485 or the VR applications 480). Although the following discussion below describes the process 1200 as being performed by a VR application, other components of a virtual reality computer system can perform the process 1200 without departing from the spirit and scope of the present disclosure. In addition, in some embodiments, not all steps of the process 1200 are performed.

A VR application may begin process 1200 at step 1210 where the VR application receives movement data for a controller. According to some embodiments, the VR application receives the movement data for the controller pointer position from a synchronizer of the virtual reality computer system, an IMU interface of the controller, or an IMU interface of the virtual reality computer system. Once the VR application receives the pointer position, it may render a pointer or cursor at the pointer position at step 1220.

According to some embodiments, at step 1230, if the pointer position is at a location as a point on a virtual object within the virtual environment, the virtual reality application may set an anchor point on the virtual object at the pointer position. For example, if the pointer position is at the same point in space in the virtual environment as a point on a virtual object representing a virtual flashlight, the virtual reality application may set the anchor point at that location. According to some embodiments, the action of moving a pointer to a location over a point of a virtual object will set the anchor point at that location and the user need not provide any additional input to set the anchor point. In some embodiments, the virtual-reality application may set the anchor point responsive to receiving an input from the controller manipulating the pointer in the virtual environment. For example, if the pointer position is at a point corresponding with a virtual object representing a tool, when the user presses a button on a controller for manipulating the pointer the controller may send input event data corresponding to the button press to the virtual reality computer system. The virtual reality computer system may then notify the VR application of the input event data, and the VR application may then set the anchor point on the tool in response.

At step 1240, the VR application may receive input event data from the controller. The input event data may, in some embodiments, represent additional motion of the controller. For example, the input event data may include movement data describing the position and/or orientation of the user's controller. In some embodiments, movement data may describe the position and/or orientation of the user's controller in space relative to a magnetic field and a gravitational field affecting the controller and the virtual-reality computer system executing the VR application. At step 1250, The VR application may use the received input event data to modify a virtual object within the virtual environment. Continuing the tool example in the paragraph above, when the user presses on the input button while hovering the pointer over the tool, the user may then move the tool in the virtual environment by moving the controller in space.

In some embodiments, at step 1240, the VR application may receive input event data corresponding to a touch input event captured by a touchpad of the user's controller. Based on the input event data corresponding to the touch input event, the VR application may modify the virtual object at the anchor point (at step 1250). As an operational example, the user may wish to manipulate a virtual knob in the virtual environment. With the controller, the user may direct a pointer over the knob using the controller. The user may not press an input button after hovering the pointer over the knob. To turn the knob left of right, the user may swipe left or right on the touchpad. Also, as described above with respect to FIG. 7B, the user may similarly operate a scrollable list by hovering a pointer over a scrollable list and scroll the list up or down by swiping up or down on the touchpad.

Figure 14:
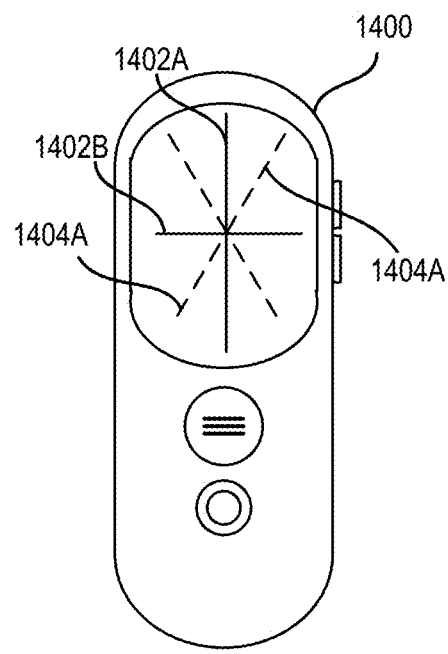
FIG. 14 shows an example of swipe boundary lines for a touchpad of a controller.

FIG. 14 shows an example of swipe boundary lines for a touchpad of a controller 1400. In some implementations, the controller 1400 can include any or all controller features and/or controller functionality described elsewhere herein. The present example relates to recognition of gestures performed on the touchpad of the controller 1400. For example, the system can be configured so as to be able to recognize and distinguish between respective "up" or "down" swipes, and also respective "left" and "right" swipes in the touchpad, and to perform a different operation depending on which gesture is detected. For example, an up or down swipe should be performed approximately in the same direction as a conceptual line 1402A that is here indicated on the controller 1400. For example, a left or right swipe should be performed approximately in the same direction as a conceptual line 1402B that is here also indicated on the controller 1400. The conceptual lines 1402A-B are here shown for illustrative purposes and need not be visible on the touchpad or in the virtual environment. In some implementations, other types of swipes than up/down or left/right can be recognized.

The system will have one or more definitions allowing it to distinguish any of the up or down swipes from a left or right swipe. For example, if the user performs a swipe that is in between the conceptual lines 1402A-B, the system will classify the swipe as being either an up/down swipe or a left/right swipe. In some implementations, the system includes a definition corresponding to respective swipe boundary lines 1404A-B. Thus, depending on where relative to the swipe boundary lines 1404A-B a swipe is detected, it can be classified accordingly. For example, a swipe performed near the conceptual line 1402A and in between the swipe boundary lines 1404A-B can be detected as either an up swipe or a down swipe. Similarly, a swipe performed near the conceptual line 1402B and in between the swipe boundary lines 1404A-B can be detected as either a left swipe or a right swipe. The swipe boundary lines 1404A-B are here shown for illustrative purposes and need not be visible on the touchpad or in the virtual environment.

The orientation of the swipe boundary lines 1404A-B can be defined in different ways. In some implementations, the swipe boundary lines 1404A-B are placed at, say, a 45 degree angle to the respective conceptual lines 1402A-B as a default. In some implementations, the placement can be based on testing. In some implementations, a group of test persons are each asked to perform a specific type of gesture (e.g., an up swipe or a right swipe) on the touchpad of the controller 1400. The input that each person generates is registered. The results of such testing for an arbitrary number of people can be analyzed to determine how the swipe boundary lines 1404A-B should be positioned relative to the conceptual lines 1402A-B. For example, this approach can lead to the swipe boundary line 1404A and/or 1404B being placed with a different angle to the respective conceptual line 1402A and/or 1402B.

Figure 15:
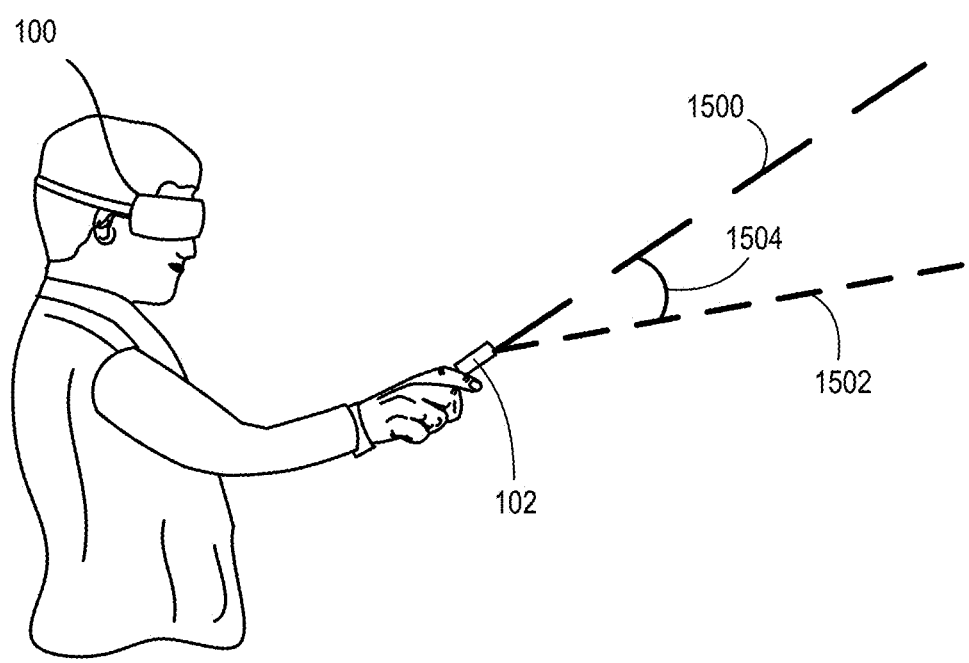
FIG. 15 shows an example of angling a virtual beam of a controller.

FIG. 15 shows an example of angling a virtual beam of the controller 102. In some implementations, the controller 102 can include any or all controller features and/or controller functionality described elsewhere herein. Here, a zero line 1500 is defined relative to the controller 102. The zero line can be defined so as to be a straight extension of an axis defined by the body of the controller 102. For example, when the controller has an elongate shape (see, e.g., FIG. 3), the zero line 1500 can represent a straight extension forward of a central axis of the body of the controller 102.

The zero line 1500 may not correspond to the direction in which the controller 102 is deemed to be pointing in the virtual environment. Rather, a virtual beam 1502 is defined in the virtual environment and is used to control one or more objects and/or functions therein (e.g., in analogy with the virtual beam 550 in FIG. 5B). The virtual beam 1502 can be angled relative to the zero line 1500 by at least one angle 1504. In some implementations, the angle 1504 is defined so that the virtual beam 1502 extends upward or downward relative to the zero line 1500. In some implementations, the angle 1504 is defined so that the virtual beam 1502 extends to the left or to the right relative to the zero line 1500. Combinations of these approaches can be used. The zero line 1500 and the virtual beam 1502 need not be visible in the virtual environment. For example, the virtual beam 1502 can be indirectly noticeable in the virtual environment by way of a cursor or other pointer that is defined at the end of the virtual beam 1502. In some implementations, this allows the person wearing the HMD 100 who uses the controller 102 in the virtual environment to see where the (angled) virtual beam 1502 is pointing. For example, the controller 102 can report its position to the system that generates the virtual environment, and the orientation of the virtual beam 1502 (including its angle(s) relative to the zero line 1500, if applicable) can then be defined based on the reported position. A virtual controller (not shown) can be presented in the virtual environment based on the reported position and the virtual beam 1502 can then originate from the position of the virtual controller, for example at an angle relative thereto.

Swipes and/or one or more other types of gestures can be detected. In some implementations, a non-swipe gesture can be detected when a user taps, or simply holds a finger on, the touchpad. For example, such detection can be made based on a threshold of an amount of finger movement on the touchpad and/or the velocity of any finger movement on the touchpad. The system can respond to detection of a non-swipe gesture by performing one or more actions, including, but not limited to, any action(s) described with regard to other examples herein.

Figure 13:
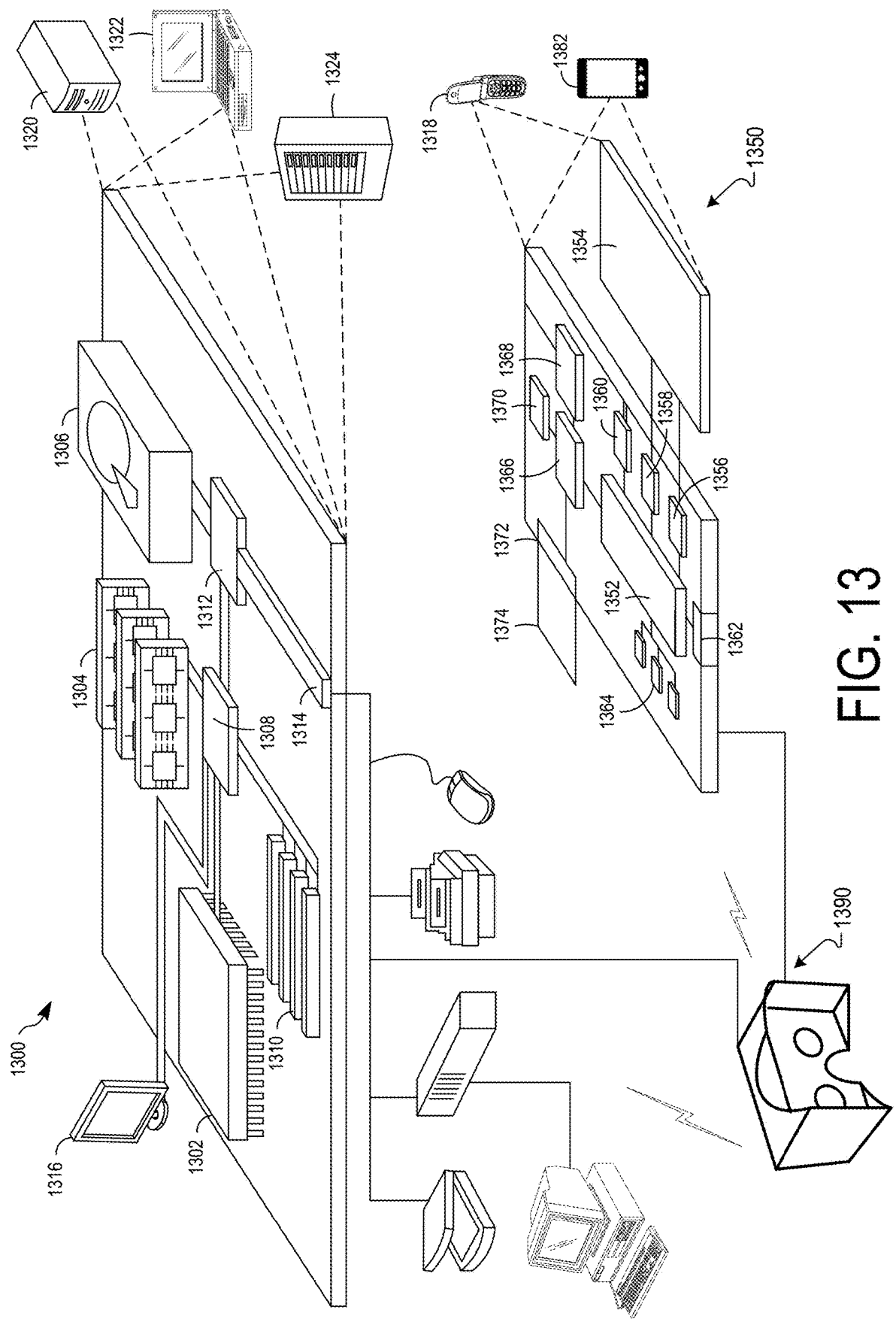
FIG. 13 shows an example of a computer device and a mobile computer device that can be used to implement the techniques described herein.

FIG. 13 shows an example of a computer device 1300 and a mobile computer device 1350, which may be used with the techniques described here. Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. In addition, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1384 may also be provided and connected to device 1350 through expansion interface 1382, which may include, for example, a SIMM (Single In Line Memory Module) card interface. Such expansion memory 1384 may provide extra storage space for device 1350, or may also store applications or other information for device 1350. Specifically, expansion memory 1384 may include instructions to carry out or supplement the processes described above, and may include secure information also. Thus, for example, expansion memory 1384 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1384, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1380 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with a virtual reality (VR headset/HMD device 1390). For example, one or more sensors included on a computing device 1350 or other computing device depicted in FIG. 13, can provide input to VR headset 1390 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the VR space that can then be used as input to the VR space. For example, the computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some implementations, a touchscreen of the computing device 1350 can be rendered as a touchpad in VR space. A user can interact with the touchscreen of the computing device 1350. The interactions are rendered, in VR headset 1390 for example, as movements on the rendered touchpad in the VR space. The rendered movements can control objects in the VR space.

In some implementations, one or more output devices included on the computing device 1350 can provide output and/or feedback to a user of the VR headset 1390 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. In the example of the laser pointer in a VR space, the computing device 1350 appears as a virtual laser pointer in the computer-generated, 3D environment. As the user manipulates the computing device 1350, the user in the VR space sees movement of the laser pointer. The user receives feedback from interactions with the computing device 1350 in the VR environment on the computing device 1350 or on the VR headset 1390.

In some implementations, a computing device 1350 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

Further implementations are summarized in the following examples:

Example 1

A controller configured to control a pointer in a virtual reality environment, the controller comprising: a multi-axis accelerometer; a gyroscope; a touchpad; a wireless communications circuit; a processor; and a memory storing instructions that when executed by the processor cause the processor to: receive, from the multi-axis accelerometer, acceleration data describing a direction and a magnitude of force affecting the controller; receive, from the gyroscope, angular velocity data describing a rotational position of the controller; generate movement data describing an orientation of the controller, the movement data based on at least one of the acceleration data or the angular velocity data; and communicate, via the wireless communications circuit, the movement data to a computing device configured to generate a rendering of the virtual reality environment.

Example 2

The controller of example 1, further comprising a multi-axis magnetic field sensor, wherein the instructions further cause the processor to receive geomagnetic field data from the multi-axis magnetic field sensor, and wherein the movement data is based also on the geomagnetic field data.

Example 3

The controller of example 1 or 2, wherein the instructions further cause the processor to detect touch events on the touchpad and generate touchpad input data responsive to the detected touch events.

Example 4

The controller of example 3, wherein the instructions further cause the processor to communicate, via the wireless communications circuit, the touchpad input data to the computing device.

Example 5

The controller of example 4, wherein the instructions further cause the processor to initiate communication of the touchpad input data when the touchpad input data reflects a change in position of the detected touch events satisfies a touchpad threshold position value.

Example 6

The controller of any one of examples 1 to 5, further comprising a first input button disposed below the touchpad.

Example 7

The controller of example 6, further comprising a second input button.

Example 8

The controller of any one of examples 1 to 7, wherein the instructions further cause the processor to initiate communication of the movement data when at least one of the acceleration data or the angular velocity data satisfies a threshold value.

Example 9

The controller of example 8, wherein the instructions further cause the processor to adjust the threshold value based on a rate of change of the acceleration data or the angular velocity data.

Example 10

The controller of any one of example 1 to 9, wherein the instructions further cause the processor to use a swipe boundary line to recognize gestures performed on the touchpad, the swipe boundary line being based on testing.

Example 11

The controller of any one of examples 1 to 10, wherein the instructions further cause the processor to define a virtual beam in the virtual reality environment using the movement data, the virtual beam angled relative to a zero line of the controller.

Example 12

The controller of any one of examples 1 to 11, further comprising a pair of input buttons configured for adjusting a range value in the virtual reality environment.

Example 13

The controller of any one of examples 1 to 12, wherein the movement data includes the acceleration data and the angular velocity data.

Example 14

A virtual reality computing system comprising: a display screen configured for rendering a virtual environment and for being disposed within a head-mounted display (HMD); a multi-axis accelerometer; a gyroscope; a wireless communications circuit; a processor; and a memory storing instructions that when executed by the processor cause the processor to: receive, from the multi-axis accelerometer, acceleration data describing a direction and a magnitude of force affecting the virtual reality computing system; receive, from the gyroscope, angular velocity data describing a rotational position of the virtual reality computing system; receive, via the wireless communications circuit, first movement data from a controller for the virtual reality computing system, the first movement data describing an orientation of the controller; determine second movement data describing an orientation of the virtual reality computing system relative to the controller, the second movement data based on the acceleration data, the angular velocity data and the first movement data; and render on the display screen a pointer based on the first movement data and the second movement data.

Example 15

The virtual reality computing system of example 14, further comprising a multi-axis magnetic field sensor, wherein the instructions further cause the processor to receive geomagnetic field data from the multi-axis magnetic field sensor, and wherein the second movement data is based also on the geomagnetic field data.

Example 16

The virtual reality computing system of any one of examples 14 or 15, wherein the instructions further cause the processor to render a calibration user interface element at a calibration location on the display screen.

Example 17

The virtual reality computing system of example 16, wherein the instructions further cause the processor to detect an input event triggered by the controller representing a selection event performed by the controller at the calibration location.

Example 18

The virtual reality computing system of example 16, wherein the instructions further cause the processor to determine a calibration value based on the first movement data, the second movement data, and the calibration location.

Example 19

The virtual reality computing system of any one of examples 14 to 18, wherein the instructions further cause the processor to receive, via the wireless communications circuit, touchpad input data describing one or more touch events detected by the controller on a touchpad of the controller.

Example 20

The virtual reality computing system of example 19, wherein the instructions further cause the processor to modify a virtual object at a position of the pointer based on the received touchpad input data.

Example 21

The virtual reality computing system of any one of examples 14 to 20, wherein the virtual reality computing system is a mobile computing device disposed within a HMD housing.

Example 22

A method for manipulating a virtual object in a virtual environment, the method comprising: receiving, by a computing system, first movement data from a controller of the virtual environment, the first movement data describing a first orientation of the controller; rendering on a display screen of the computing system, a pointer at a pointer position within the virtual environment, the pointer position based on the received first movement data; setting, based on the pointer position, an anchor point on a virtual object rendered at the pointer position; receiving first input event data from the controller; and modifying the virtual object based on the received first input event data.

Example 23

The method of example 22, further comprising receiving second input event data from the controller.

Example 24

The method of example 23, wherein setting the anchor point is done responsive to receiving the second input event data.

Example 25

The method of example 24, wherein the second input event data corresponds to depression of an input button of the controller.

Example 26

The method of example 25, wherein the input button of the controller is disposed under a touchpad of the controller.

Example 27

The method of any one of examples 23 to 26, further comprising receiving third input event data from the controller.

Example 28

The method of example 27, wherein the third input event data includes second movement data describing a second orientation of the controller.

Example 29

The method of any one of examples 22 to 28, wherein the first input event data includes touch input event data corresponding to a touch event captured by a touchpad of the controller.

Example 30

The method of example 29, wherein the touch input event data describes at least one selected from the group consisting of a swipe event, a touch-and-drag event, and a pinch and zoom event.

Example 31

The method of any one of examples 29 or 30, wherein the first movement data describes the first orientation of the controller relative to a magnetic field affecting the controller and the computing system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A controller configured to control a pointer in an augmented reality environment, the controller comprising:
   a multi-axis accelerometer;
   a gyroscope;
   a touchpad;
   a wireless communications circuit;
   a processor; and
   a memory storing instructions that when executed by the processor cause the processor to:
      receive, from the multi-axis accelerometer, acceleration data describing a direction and a magnitude of force affecting the controller;
      receive, from the gyroscope, angular velocity data describing a rotational position of the controller;
      generate movement data describing a six degree of freedom position and orientation of the controller, the movement data based on at least one of the acceleration data or the angular velocity data; and
      communicate, via the wireless communications circuit, the movement data to a computing device configured to generate a rendering of the augmented reality environment,
   wherein the instructions further cause the processor to use a swipe boundary line to recognize gestures performed on the touchpad, the swipe boundary line being based on testing.

2. The controller of claim 1, further comprising a multi-axis magnetic field sensor, wherein the instructions further cause the processor to receive geomagnetic field data from the multi-axis magnetic field sensor, and wherein the movement data is based also on the geomagnetic field data.

3. The controller of claim 1, wherein the instructions further cause the processor to detect touch events on the touchpad and generate touchpad input data responsive to the detected touch events.

4. The controller of claim 3, wherein the instructions further cause the processor to communicate, via the wireless communications circuit, the touchpad input data to the computing device.

5. The controller of claim 4, wherein the instructions further cause the processor to initiate communication of the touchpad input data when the touchpad input data reflects a change in position of the detected touch events satisfies a touchpad threshold position value.

6. The controller of claim 1, further comprising a first input button disposed below the touchpad.

7. The controller of claim 6, further comprising a second input button.

8. The controller of claim 7, wherein the second input button is a menu button, the controller further comprising a third input button configured to perform an action on an object within the augmented reality environment.

9. The controller of claim 1, wherein the instructions further cause the processor to initiate communication of the movement data when at least one of the acceleration data or the angular velocity data satisfies a threshold value.

10. The controller of claim 9, wherein the instructions further cause the processor to adjust the threshold value based on a rate of change of the acceleration data or the angular velocity data.

11. The controller of claim 1, wherein the instructions further cause the processor to define a virtual beam in the augmented reality environment using the movement data, the virtual beam angled relative to a zero line of the controller.

12. The controller of claim 1, further comprising a pair of input buttons configured for adjusting a range value in the augmented reality environment.

13. The controller of claim 1, wherein the movement data includes the acceleration data and the angular velocity data.

14. An augmented reality computing system comprising:
a display screen configured for rendering an augmented reality environment and for being disposed within a head-mounted display (HMD);
a multi-axis accelerometer;
a gyroscope;
a wireless communications circuit;
a processor; and
a memory storing instructions that when executed by the processor cause the processor to:
receive, from the multi-axis accelerometer, acceleration data describing a direction and a magnitude of force affecting the augmented reality computing system;
receive, from the gyroscope, angular velocity data describing a rotational position of the augmented reality computing system;
receive, via the wireless communications circuit, first movement data from a controller for the augmented reality computing system, the first movement data describing an orientation of the controller;
determine second movement data describing an orientation of the augmented reality computing system relative to the controller, the second movement data based on the acceleration data, the angular velocity data and the first movement data;
render on the display screen a pointer based on the first movement data and the second movement data;
render a calibration user interface element at a calibration location on the display screen; and
determine a calibration value based on the first movement data, the second movement data, and the calibration location.

15. The augmented reality computing system of claim 14, wherein the instructions further cause the processor to detect an input event triggered by the controller representing a selection event performed by the controller at the calibration location.

16. The augmented reality computing system of claim 14, wherein the virtual reality computing system is a mobile computing device disposed within a HMD housing.

17. The augmented reality computing system of claim 14, further comprising a multi-axis magnetic field sensor, wherein the instructions further cause the processor to receive geomagnetic field data from the multi-axis magnetic field sensor, and wherein the second movement data is based also on the geomagnetic field data.

18. The augmented reality computing system of claim 17, wherein the instructions further cause the processor to receive, via the wireless communications circuit, touchpad input data describing one or more touch events detected by the controller on a touchpad of the controller.

19. The augmented reality computing system of claim 18, wherein the instructions further cause the processor to modify a virtual object at a position of the pointer based on the received touchpad input data.

20. A method for manipulating a virtual object in a virtual environment, the method comprising:
receiving, by a computing system, first movement data from a controller of the virtual environment, the first movement data describing a first orientation of the controller;
receiving, by the computer system, acceleration data and angular velocity data from the controller;
determining, by the computer system, second movement data based on the acceleration data, the angular velocity data and the first movement data;
rendering on a display screen of the computing system, a pointer at a pointer position within the virtual environment, the pointer position based on the received first movement data and the second movement data;
setting, based on the pointer position, an anchor point on a virtual object rendered at the pointer position;
receiving first input event data from the controller;
modifying the virtual object based on the received first input event data;
render a calibration user interface element at a calibration location on the display screen; and
determine a calibration value based on the first movement data, the second movement data, and the calibration location.

21. The method of claim 20, further comprising receiving second input event data from the controller.

22. The method of claim 21 wherein setting the anchor point is done responsive to receiving the second input event data.

23. The method of claim 22, wherein the second input event data corresponds to depression of an input button of the controller.

24. The method of claim 23, wherein the input button of the controller is disposed under a touchpad of the controller.

25. The method of claim 21, further comprising receiving third input event data from the controller.

26. The method of claim 25, wherein the third input event data includes second movement data describing a second orientation of the controller.

27. The method of claim 20, wherein the first input event data includes touch input event data corresponding to a touch event captured by a touchpad of the controller.

28. The method of claim 27, wherein the touch input event data describes at least one selected from the group consisting of a swipe event, a touch-and-drag event, and a zoom event.

29. The method of claim 27, wherein the first movement data describes the first orientation of the controller relative to a magnetic field affecting the controller and the computing system.

* * * * *